United States Patent [19]

Zwick

[11] 4,044,549

[45] Aug. 30, 1977

[54] LOW EMISSION COMBUSTION PROCESS AND APPARATUS

[76] Inventor: Eugene B. Zwick, 16841 Edgewater Lane, Huntington Beach, Calif. 92647

[21] Appl. No.: 629,071

[22] Filed: Nov. 5, 1975

Related U.S. Application Data

[63] Continuation of Ser. No. 313,681, Dec. 11, 1972, abandoned.

[51] Int. Cl.[2] .......... F02C 9/14

[52] U.S. Cl. .......... 60/39.02; 60/39.05; 60/39.23; 60/39.28 R; 60/39.65; 60/39.51 R; 60/39.72 R; 60/DIG. 11

[58] Field of Search .......... 60/39.02, 39.03, 39.05, 60/39.23, 39.27, 39.29, 39.65, DIG. 11

[56] References Cited

PUBLICATIONS

Final Report—Evaluation of a Low Nox Burner by E. B. Zwick et al.—Prepared for EPA dated July, 1971.

Formation and Control of Oxides of Nitrogen Emissions from Gas Turbine Combustion Systems Author—P. P. Singh et al. Oct. 1972, pp. 271-278, Journal of Engineering for Power.

*Primary Examiner*—Clarence R. Gordon
*Attorney, Agent, or Firm*—William H. Pavitt, Jr.

[57] ABSTRACT

A process for forming low-emission combustion gases. A lean mixture of fuel and air provides a substantially homogeneous mixture within the combustion zone. The fuel is preferably vaporized and, alternatively, may be introduced into the burner as microscopic droplets. Combustion temperature is maintained below about 3,000° F. to reduce nitrogen oxides and combustion is conducted under stable conditions which sufficiently exceed lean blowout to reduce formation of carbon monoxide and unburned hydrocarbons. The flow velocity into the burner is higher than the turbulent flame velocity.

A dilution zone may be provided downstream from the combustion zone. To control performance, input air may be split into a first stream to the combustion zone and a second stream to the dilution zone. A quantity of water may be admixed with the fuel and be prevaporized to form water vapor containing fuel droplets.

A method of operating a gas turbine with a burner operated as above, generating combustion gases to the turbine.

A burner for producting low emission exhaust gases. The burner has a combustion zone and a dilution zone with means to split air input into a first stream to the combustion zone and a second stream to the dilution zone.

The combination of a burner and a gas turbine with the burner having a combustion zone and a dilution zone. Diversion means vary the fuel-to-air ratio in the combustion zone by diverting air to the dilution zone to produce low emission exhaust gases to drive the turbine.

27 Claims, 20 Drawing Figures

Fig. 12
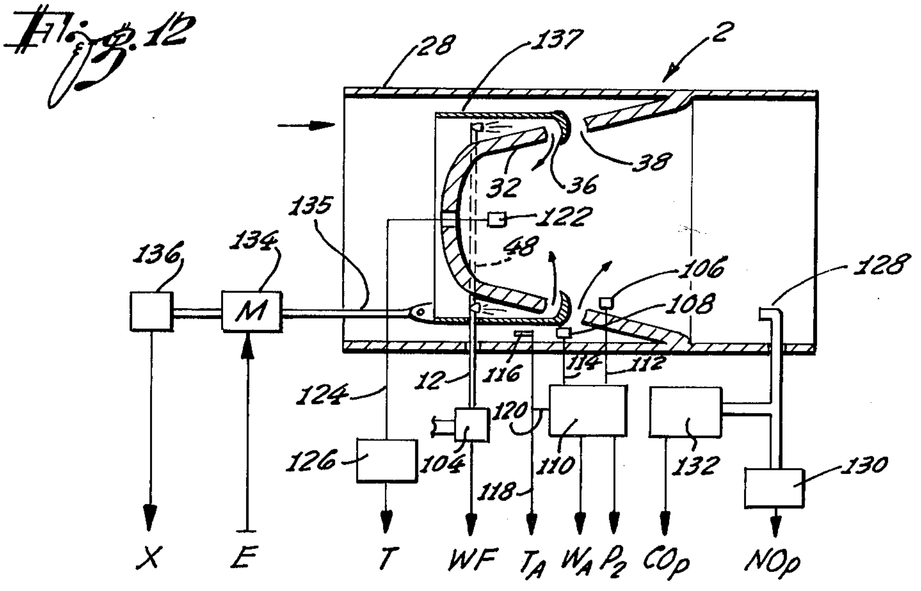
Fig. 13
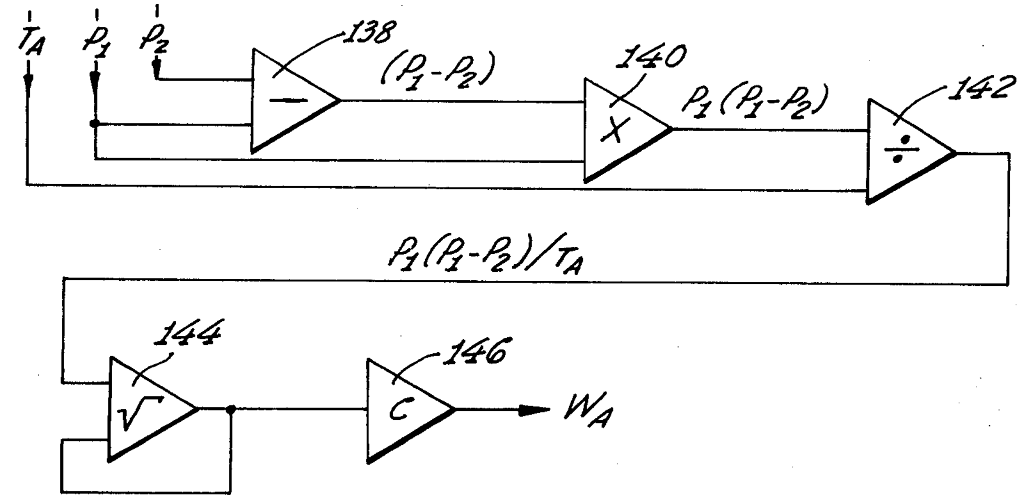
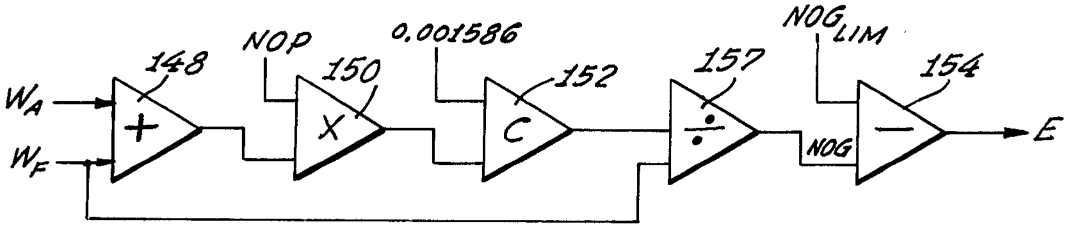
Fig. 14

LOW EMISSION COMBUSTION PROCESS AND APPARATUS

This is a continuation of application Ser. No. 313,681, filed Dec. 11, 1972, now abandoned.

BACKGROUND OF THE INVENTION

Various studies have identified the internal combustion engine as a chief contributor to air pollution and Federal Standards have been enacted to sharply reduce the permissible content of nitrogen oxides, carbon monoxide, and unburned hydrocarbons in exhaust gases.

As an alternative to the Otto Cycle engine presently used on most automobiles, various manufacturers have considered the use of a gas turbine engine. In providing gases to operate a gas turbine, it has been thought necessary to burn at a relatively high temperature to obtain complete combustion and to oxidize the hydrocarbon fuel to carbon dioxide and water. It has also been thought necessary to conduct the combustion either under stoichiometric conditions or on the rich side of stoichiometric on the theory that this would use up the available oxygen through reaction with the fuel to provide stable combustion and to reduce formation of nitrogen oxides.

During combustion, a number of competing chemical reactions take place, such as reaction of oxygen in the air with carbon atoms in the fuel to form carbon monoxide, reaction of carbon monoxide with additonal oxygen to form carbon dioxide, reaction of hydrogen with oxygen to form water, and reaction of oxygen with nitrogen to form nitric oxide. It has been reasoned that the controlling chemical reaction governing the use of oxygen in the combustion is the reaction of hydrogen, hydrocarbons and carbon monoxide with oxygen. By having an excess quantity of fuel, or an insufficient amount of air for complete combustion, it was reasoned that the oxygen would be consumed in reacting with carbon and hydrogen would, thus, not be available to form oxides of nitrogen.

Previous approaches to combustion in reducing air pollution have, in general, not proved satisfactory. It has been found that formation of nitrogen oxides in the exhaust gases is very difficult to control. When conditions are employed which promote complete combustion by using high combustion temperatures and excess oxygen, it has been found that substantial quantities of nitrogen oxides are formed. Thus, the conditions required for complete oxidation of carbon to carbon dioxide with suppression of carbon monoxide and unburned hydrocarbon formation are apparently contradictory to the conditions required for reducing formation of nitrogen oxides. The use of excess fuel in an attempt to reduce formation of nitrogen oxides has also proven unsatisfactory. With excess fuel present, the formation of carbon monoxide and unburned hydrocarbons is increased. Also, seemingly contrary to theory, nitrogen oxides are formed even though the fuel is used in excess quantities.

There is a need for a combustion process to generate usable power in which the carbon monoxide, unburned hydrocarbon and nitrogen oxide contents of the exhaust gases are reduced. Also, there is a need for such a combustion process and an apparatus utilizing the principles of the process in providing power for automobiles.

SUMMARY OF THE INVENTION

In accord with the present invention, there is provided a combustion process and apparatus in which exhaust gases are formed which have a reduced content of carbon monoxide, unburned hydrocarbons, and nitrogen oxides. It has been found that the determining factor in reducing formation of nitrogen oxides is the combustion temperature. At relatively high combustion temperatures, e.g., 4000° or 4500° F, relatively large quantities of nitrogen oxides are produced even when the fuel is present in stoichiometric excess. Thus, in the present process, the combustion temperature is maintained at about 3000° F or less, and preferably about 2700° F or less. By thus reducing the combustion temperatures, the production of nitrogen oxides in the exhaust gases is greatly reduced.

Unlike prior art processes, the present combustion process is carried out at very lean fuel-to-air ratios ranging from about 0.0035 to about 0.035 pounds of fuel per pound of air. At these low fuel/air ratios, the temperature of the inlet air to the burner, the burner volume, the static pressure within the burner, and the air flow rate through the combustion zone are maintained to operate the burner under stable combustion conditions which exceed lean blowout, e.g., about 2,000° F to about 2500° F and higher, to a sufficient extent to reduce the carbon monoxide and unburned hydrocarbons content of the exhaust gases to acceptable levels. At lean blowout conditions, a high content of carbon monoxide and unburned hydrocarbons is present in the exhaust gases. However, it has been found that the level of carbon monoxide and unburned hydrocarbons in the exhaust gases drop off sharply if the combustion is controlled under conditions which slightly exceed lead blowout.

In conducting the present process, it is necessary that the combustible mixture be substantially homogeneous throughout the combustion zone. Under these conditions, combustion occurs uniformly throughout the combustion zone to produce the conditions that are obtained theoretically in a well-stirred reactor. Combustion under these conditions does not produce a visible flame within the combustion zone since the combustion takes place uniformly throughout the entire zone without a line of demarcation between burning in one part of the zone and an absence of burning in another part of the combustion zone.

If the combustion is not conducted under conditions which produce substantial uniformity throughout the combustion zone, local hot spots may develop, for example, around large fuel droplets where the combustion temperature may be considerably higher than 3000° F. Excessive quantities of nitrogen oxides are formed by localized hot spots due to the localized high combustion temperatures. By maintaining substantial homogeneity throughout the combustion zone, the formation of hot spots is avoided and the formation of nitrogen oxides in the exhaust gases is reduced.

If the walls of the burner are cold in relation to the combustion temperature within the burner, the combustion reaction is quenched in the regions adjacent the walls. This can locally reduce the temperature of the gaseous mixture with the result that excessive quantities of carbon monoxide and unburned hydrocarbons are formed due to incomplete combustion adjacent the burner walls. To reduce the formation of carbon monoxide and unburned hydrocarbons in the present process, the burner walls are preferably well insulated so that the wall temperatures are reasonably close to the combustion temperature within the burner. Means may also be provided to prevent heat loss from the walls by radiation.

In conducting a combustion reaction in which the gaseous mixture in the combustion zone is substantially homogeneous, there is a tendency for the combustion to flash back to the point of introduction of the fuel. This is undesirable for several reasons. First, the fuel and air are, in general, not uniformly mixed at the point of introduction of the fuel, and, hence, locally high combustion temperatures may occur. Secondly, the structure of the burner in the fuel mixing region may not be able to tolerate the high temperatures which can arise from combustion of the near stoichiometric stream, which may exist locally near the point of introduction of the fuel. Thus, the exhaust gases may be high in nitrogen oxides due to high localized temperatures at the point of combustion. In conducting the present process, flashback is prevented by maintaining the flow rate into the combustion zone, and also preferably through the mixing region, at a level which is in excess of the turbulent flame velocity under the combustion conditions employed.

To insure substantial homogeneity within the combustion zone, the fuel is preferably vaporized prior to its introduction into the burner. This can be conveniently accomplished, for example, through the use of a vaporizer in which the pressurized fuel is passed between heat exchange surfaces and vaporized. The vapor is then admixed with air, and fed to the combustion zone.

In utilizing the process to provide power for a gas turbine, the fuel vaporizer may be heated in a number of ways. If desired, a portion of the exhaust gas from the turbine may be used as a heat exchange source for the vaporizer and a heat leak may be employed to remove excess heat from the vaporizer so that the fuel is not heated to a temperature which causes decomposition. Heat exchange from the exhaust gas to the fuel may also be controlled by a valve which reduces the exhaust gas flow through the heat exchanger when the heat in the exhaust gases would tend to raise the temperature of the fuel above its decomposition temperature. Input air to the burner may be compressed and heated by passing the air through a compressor driven by the turbine.

During start-up the fuel vaporizer may be heated electrically, e.g., from a battery. Also, several vaporizers may be employed in which a start-up vaporizer having a relatively small mass is heated by power from a battery while another vaporizer having a larger mass is used after the turbine is operating with turbine exhaust gases or compressed input air being used to provide heat for the vaporizer. Fuel may also be vaporized by producing a fine spray of droplets which are then mixed with a warm air stream and allowed to evaporate as mixing takes place prior to passage of the mixture into the combustion zone. The fuel may also vaporize as it mixes prior to combustion by contact with warm surfaces in the mixing region before entry into the combustion zone.

Although desirable, it is not essential that the fuel be completely vaporized before being introduced to the primary combustion zone. If the fuel is, for example, 50% vaporized to produce a cloud of vapor with microscopic fuel droplets entrained within the vapor, the cloud may be mixed with air and then introduced directly to the primary combustion zone to produce essentially uniform combustion. In promoting the formation of fuel droplets carried by a vapor, particularly during start-up when the heat supply for the vaporizer is limited, a quantity of water may be added to the fuel with the water used to form vapor to suspend the fuel droplets. Water has a much lower molecular weight than, for example, a diesel fuel. Assuming that water has a molecular weight which is 1/10th that of diesel fuel, the weight of water required to produce a given volume of vapor will be approximately 1/10th the weight of diesel fuel required to produce the same volume of vapor. The amount of water required to form a given quantity of vapor will, therefore, be much less than the amount of fuel required to produce the same amount of vapor. Thus, there is a savings in the heat required to vaporize the required amount of water as opposed to the heat required to vaporize the equivalent higher weight of fuel. Water may be used during start-up with a limited heat source, such as a battery, to provide water vapor to carry finely divided entrained fuel droplets. With less heat required to vaporize the water-fuel mixture, the start-up time may be reduced.

By conducting the combustion process in the manner described above, the level of nitrogen oxides in the exhaust gases is reduced to about 1.5 grams or less per kilogram of consumed fuel while the carbon monoxide level is reduced to about 12 grams or less per kilogram of consumed fuel. In the practice of the present process, the formation of unburned hydrocarbons is interrelated to the formation of carbon monoxide in the exhaust gases. Thus, when the carbon monoxide levels in the exhaust gases are reduced to about 12.0 grams or less per kilogram of consumed fuel, the content of unburned hydrocarbons in the exhaust gases is reduced to about 1.50 grams or less per kilogram of consumed fuel.

The 1976 Federal Standards for automotive emissions are 0.4 grams per mile of nitrogen oxides, 3.4 grams per mile of carbon monoxide, and 0.41 grams per mile of unburned hydrocarbons. Assuming a fuel economy of 10 miles to the gallon, these figures correspond to 1.38 grams of nitrogen oxides per kilogram of consumed fuel and 11.8 grams of carbon monoxide per kilogram of consumed fuel. Using the same assumption that the fuel economy is 10 miles per gallon, the permissible level of unburned hydrocarbons in the exhaust gases is 1.42 grams per kilogram of consumed fuel.

In accord with another embodiment of the invention, a system is provided for reducing the nitrogen oxide and carbon monoxide content of exhaust gases in which a turbine is supplied with heated combustion products from a burner having a combustion zone, an igniter means within the combustion zone, and a dilution zone positioned downstream and in flow communication with the combustion zone. Means are provided for mixing a hydrocarbon fuel, such as diesel fuel, with air to form a substantially homogeneous combustible mixture having a fuel to air ratio of about 0.0035 to about 0.035. Means are also provided for splitting the incoming stream of air into separate streams with a first stream being mixed with the fuel and fed to the combustion zone while a second stream is fed to the dilution zone. Control means are provided to control the splitting of the incoming stream of air to provide a fuel to air ratio within the combustion zone that maintains the combustion temperature at about 3,000° F or less sufficient to reduce the nitrogen oxides content in the exhaust gases to a level of about 1.5 grams or less per kilogram of consumed fuel. The fuel-to-air ratio within the combustion zone also maintains stable combustion at a sufficient level above lean blowout to provide a carbon monoxide level in the exhaust gases from the burner of about 12.0 grams or less per kilogram of consumed fuel. Means are provided to convey the exhaust gases from the burner to the turbine rotor to generate useful power while maintaining the nitrogen oxide and carbon monoxide content of the exhaust gases from the turbine at reduced levels.

In promoting the overall efficiency of the system, heat exchanger means may be provided to transfer heat from the exhaust gases from the turbine rotor to the incoming stream of air to preheat the air prior to its introduction into the burner. Also, means may be provided to transfer heat from the turbine exhaust gases to the fuel with the heat transfer taking place at a temperature below the decomposition temperature of the fuel. In insuring that heat transfer to the fuel takes place at a temperature below its decomposition temperature, means may be provided to limit the heat transfer from the exhaust gases or to dissipate excess heat from the exhaust gases which would otherwise raise the temperature above the decomposition temperature. One convenient means of dissipating excess heat from the exhaust gases is to provide a heat leak in which heat is transferred from the exhaust gases to the fuel through a vapor whose temperature is controllable by the pressure above a second liquid in heat transfer relation therewith. When the temperature of the exhaust gases is sufficient to raise the second liquid to its boiling point, heat is rapidly removed from the exhaust gases through vaporization of the second liquid. The vapor which is formed may then be conveyed to a condenser and is then returned to the fuel vaporizer.

The burner employed in the overall system may include a wall which has first apertures therein positioned adjacent to the combustion zone and second apertures therein positioned adjacent to the dilution zone. Both the first and second apertures are positioned in flow communication with the incoming stream of air and valve means are positioned in partial overlying relation to the first and second apertures. By moving the valve means with respect to the apertures in the burner wall, the extent of the opening through the first apertures may be varied with respect to the extent of the opening through the second apertures to vary the flow split or bypass of the incoming air between the dilution zone and the combustion zone.

In controlling the flow split or bypass of the incoming air between the combustion zone and the dilution zone, the valve means may be stationary with the burner wall including a movable portion that may be moved relative to the valve means. By movement of a portion of the burner wall, while the valve means are fixed, the extent of the opening of the first apertures with respect to the second apertures may be varied which varies the flow split of air between the combustion zone and the dilution zone.

The turbine which is driven by the burner exhaust gases may be associated with a compressor which is driven by the turbine rotor. The incoming air stream may then be conveyed through the compressor to compress and heat the air prior to its introduction into the burner. Heat may also be extracted from the burner exhaust and used to heat the compressor discharge prior to combustion.

In controlling the combustion conditions within the burner to achieve low nitrogen oxide and carbon monoxide levels, the fuel to air ratio within the combustion zone may be varied, as described above, by bypassing a portion of the incoming air directly to the dilution zone.

In addition to providing an overall system for producing power through operation of a gas turbine, the present invention provides a burner whose structure has particular applicability in producing exhaust gases having a low content of nitrogen oxides and carbon monoxide. The burner includes a burner body which defines a combustion zone and a dilution zone. First apertures are positioned adjacent to the combustion zone while second apertures are positioned adjacent to the dilution zone. The extent of the openings through the first and second apertures may be varied through movement of a valve means with respect to the burner with the valve means partially overlying the first and second apertures. Also, the extent of the openings through the first and second apertures may be varied by using a burner having a wall portion which is movable. By moving the wall portion, while holding the valve means fixed, the extent of the openings through the first and second apertures may be varied to vary the flow split between the combustion zone and the dilution zone.

In splitting the flow of inlet air between the combustion zone and the dilution zone, the degree of flow split or bypass may be determined by sensing the nitrogen oxide or carbon monoxide levels in the burner exhaust gases or the combustion temperature within the burner. A signal or force is then provided which is used to control the splitting of the incoming air.

THE DRAWINGS

To illustrate the invention, several embodiments of the invention are illustrated in the accompanying drawings in which:

FIG. 12 is a schematic diagram illustrating the control of the flow split or bypass of the incoming air in response to one or more parameters;

FIG. 13 is a diagram of a circuit for determining the air flow rate to the burner in pounds per second;

FIG. 14 is a diagram of a circuit for controlling the flow split of the incoming air in response to the nitrogen oxides content in the burner exhaust gases;

DETAILED DESCRIPTION

Figure 1:
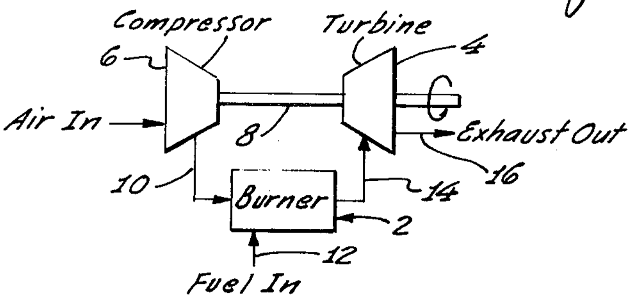
FIG. 1 is a schematic diagram illustrating a burner which supplies exhaust gases to drive a rotor in a gas turbine engine.

FIG. 1 illustrates a burner 2 which receives incoming air through an air passage 10 from a compressor 6. Fuel is introduced to the burner 2 through a fuel passage 12 with the exhaust products from the burner passing through an exhaust gas passage 14 to a turbine rotor 4. The turbine rotor 4 drives the compressor 6 through rotation of a shaft 8 and the exhaust gases are discharged from the turbine rotor 4 through an exhaust gas passage 16.

Figure 2:
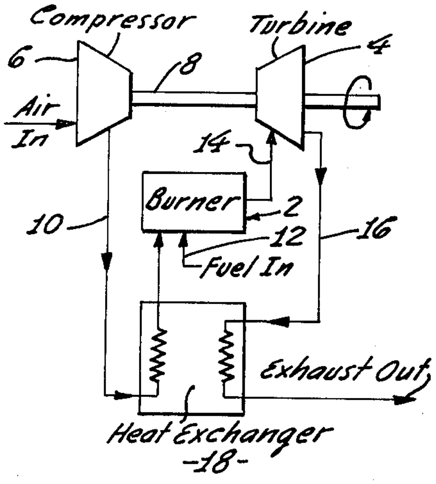
FIG. 2 is a schematic diagram illustrating a burner which supplies exhaust gases in driving the rotor of a gas turbine engine with the turbine exhaust being used to transfer heat to the incoming air to the burner.
Figure 3:
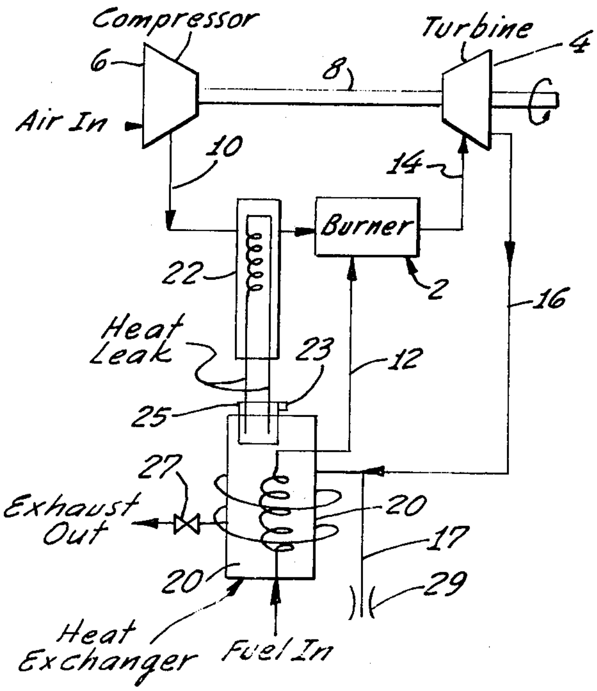
FIG. 3 is a schematic diagram of a burner supplying exhaust gases to a turbine rotor with the turbine exhaust gases used to transfer heat to the incoming fuel to the burner at a temperature which is below the decomposition temperature of the fuel.

To increase the overall efficiency of the general system, the exhaust gases from the turbine rotor 4 may be conveyed to a heat exchanger 18, as illustrated in FIG. 2, where heat is exchanged with the incoming air fed to the burner 2 through passage 10. In another variation of the system, as shown in FIG. 3, the exhaust gases from the turbine rotor 4 may be used to transfer heat to the incoming fuel introduced to the burner through a fuel passage 12. As illustrated, the exhaust gases from the turbine rotor 4 are conveyed to a heat exchanger 20. The heat exchanger 20 may contain a fluid under pressure and fuel passage 12 passes through the heat exchanger 20. The heat is transferred from the exhaust gas passage 16 through the body of the heat exchanger to the fluid, and then from the fluid to the incoming fuel in passage 12. Excess heat within the heat exchanger 20 is transferred to a liquid within a container 25 that is in heat transfer relation with the heat exchanger 20. The container 25 may be pressurized through a valve 23 and when the vapor pressure of the liquid within the container 25 reaches the pressure in the container, the liquid will begin to boil. The vapor which is formed is then conveyed to a condenser 22 where it is cooled by heat transfer to the incoming air to convert the vapor to its liquid state for return to the container 25.

The heat of vaporization of a liquid is relatively large as compared with its specific heat. Thus, the liquid within container 25 serves as a heat leak to rapidly dissipate excess heat in the turbine exhaust gases which would tend to raise the temperature of the liquid above its boiling point—which boiling point is below the decomposition temperature of the fuel. The valve 23 permits pressurizing the liquid within container 25 to any desired pressure which changes the boiling point of the liquid and the limiting heat transfer temperature imposed by the heat leak.

The quantity of heat transferred to the fuel within heat exchanger 20 may also be regulated by a valve 27. On closing valve 27, all of the turbine exhaust gases are transferred through a bypass line 17 to a discharge orifice 29 to bypass the heat exchanger 20. However, as valve 27 is opened, an increasing percentage of the exhaust gases are passed in heat transfer relation with the heat exchanger 20.

Figure 4:
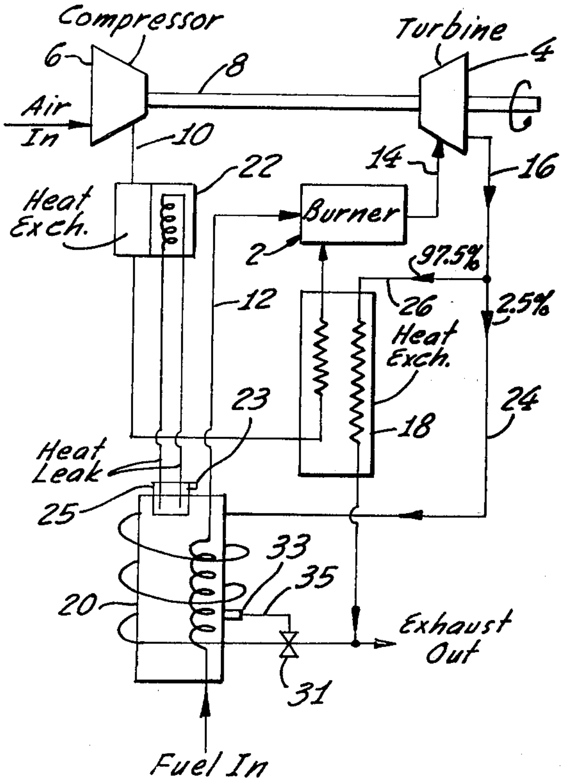
FIG. 4 is a schematic diagram combining the features of FIGS. 2 and 3 in which the exhaust gases from the turbine rotor are used to both preheat the incoming air and to prevaporize the incoming fuel.

FIG. 4 illustrates a system which includes the complexities of the systems of both FIGS. 2 and 3 in providing a more efficient system. The exhaust gases from the turbine rotor 4 which exit through passage 16 may be split, for example, with 97.5% of the gases conveyed through a passage 26 to a heat exchanger 18 while 2.5% of the gases are conveyed through a passage 24 which bypasses heat exchanger 18. Within heat exchanger 18, heat is transmitted from the turbine exhaust gases to the incoming air stream conveyed to burner 2 through passage 10. In addition to heating the incoming air stream, the turbine exhaust gases are used to prevaporize the incoming fuel through a second heat exchanger 20. The heat exchanger 20 may employ a heat leak utilizing a condenser 22, as described in FIG. 3, to maintain the heat transfer at a temperature which is below the decomposition temperature of the incoming fuel.

If desired, all or a portion of the turbine exhaust gases may be bypassed around the heat exchanger 20 through line 18 by the closing of an exhaust valve 31. The valve 31 may be regulated to bypass exhaust gases by a conventional bimetallic temperature controller 33 which transmits a control signal to valve 31 through a control line 35.

The systems shown in FIGS. 1–4 illustrate the manner in which a burner may be utilized in producing exhaust gases used to drive a gas turbine. In accord with the present invention, the burner indicated as 2 in these figures, is operated to produce exhaust gases which have a relatively low level of nitrogen oxides, carbon monoxide, and unburned hydrocarbons. As will be described subsequently, this is accomplished by controlling the fuel-to-air ratio within the burner combustion zone to maintain the combustion temperature at about 3000° F or less while providing stable combustion at a level sufficiently above lean blowout to reduce the carbon monoxide content of the burner exhaust gases to a relatively low level. While various burners may be employed in the invention, several burner constructions which are particularly suitable are illustrated in FIGS. 5–8.

Figure 5:
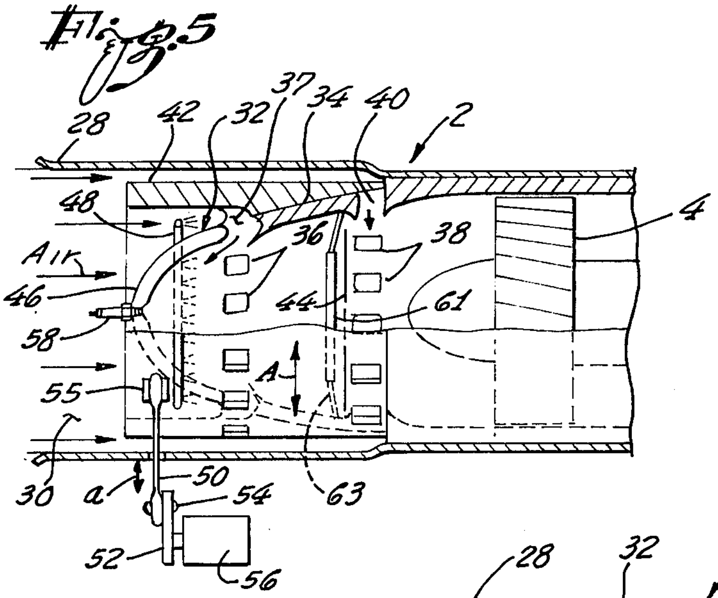
FIG. 5 is a detail view in partial section illustrating a burner configuration in which a movable valve portion positioned in overlying relation to first and second apertures in the burner is rotated to control the volume of air introduced through the apertures.

Turning to FIG. 5, the burner 2 includes a shroud 28 which defines an air passage 30. A burner body 32 is positioned centrally of the shroud 28 and includes a burner wall 34 having first apertures 36 positioned adjacent a combustion zone within the burner and second apertures 38 positioned adjacent a dilution zone within the burner. The combustion zone is that region within which the fuel air mixture entering through the first apertures is substantially completely burned. The dilution zone is that region within which bypass air, if any, is mixed with the combustion products flowing from the combustion zone. The general line of demarcation between the combustion zone and the dilution zone is indicated by the broken line 44 with the combustion zone line lying to the left of line 44 and the dilution zone to the right.

The burner 2 includes a nose portion 46 having an igniter 58, which may be a spark plug, positioned at its center. A fuel injection manifold 48 having a plurality of nozzles is positioned in the air stream leading to the first apertures 36 to provide thorough mixing of the fuel and air to form a substantially homogeneous combustible mixture within a mixing region 37 which is introduced into the combustion zone through apertures 36. The air flow rate through the apertures and preferably also past the manifold is in excess of the turbulent flame velocity within the combustion zone of the burner 2. Thus, combustion flashback into the mixing region 37 to the point of introduction of the fuel is prevented.

A deflector 61 may be positioned within the burner body 32 by support members 63 which connect the deflector 61 to some portion of the burner structure such as the wall 34. The deflector 61 performs several functions. It promotes combustion turbulence by deflecting the combustion gases toward the wall 34 and also radiates heat to the combustion zone from its hot surfaces. This is particularly important as it is one means of keeping the walls of the burner hot to avoid quenching of the combustion reaction along the walls in the combustion zone. If the walls of the combustion zone structure are cold enough to quench the reaction, carbon monoxide and/or unburned hydrocarbon can escape from the combustion zone into the dilution zone before they have had a chance to fully burn. This in turn could lead to high levels of these undesirable materials in the burner exhaust.

The deflector 61 can have any convenient shape, such as tubular, so long as it blocks cold downstream surfaces from view by the hot walls of the combustion zone to prevent radiation from the walls of the combustion zone to the cold surfaces.

Lips 40 and 41 may be provided on the second apertures 38 and first apertures 36 to direct the incoming air toward the axis of the burner 2. As shown, the lips 41 direct the incoming air and fuel forwardly into the combustion zone while the lips 40 merely direct the incoming air radially. A rotatable valve member 42 is positioned in partial overlying relation with respect to the first and second apertures 36 and 38. The valve member 42 contains apertures which are either brought into or out of alignment with the first and second apertures 36 and 38 on rotation of the valve member. The apertures in valve member 42 and the apertures 36 and 38 are arranged so that rotation of member 42 which increases the opening through apertures 36 will decrease the opening through apertures 38 and vice versa. Rotation of valve member 42 is accomplished by movement of a control arm 50 connected to the valve member 42 through a bracket 55. The control arm 50 is eccentrically mounted on a plate 52 through a pivot 54 with rotation of the plate 52 controlled by a control means 56.

As illustrated, rotation of the plate 52 in the directions of the arrow a causes rotational movement of the valve member 42 in the directions of the arrow A. In this manner, the flow split of the air through apertures 36 and apertures 38 is controlled. Assuming that the total flow rate of air is a relatively fixed quantity, it can be seen that by increasing the flow of air introduced through apertures 38, there will be corresponding reduction in the air introduced through apertures 36. This will in turn increase the fuel to air ratio within the combustion zone of the burner 2. By thus controlling the fuel to air ratio within the combustion zone of the burner 2, the combustion temperature is controlled at a level sufficiently above lean blowout to provide stable combustion with reduced carbon monoxide and unburned hydrocarbon formation and at a level of about 3000° F or sufficiently below to provide reduced nitrogen oxide formation.

Figure 6:
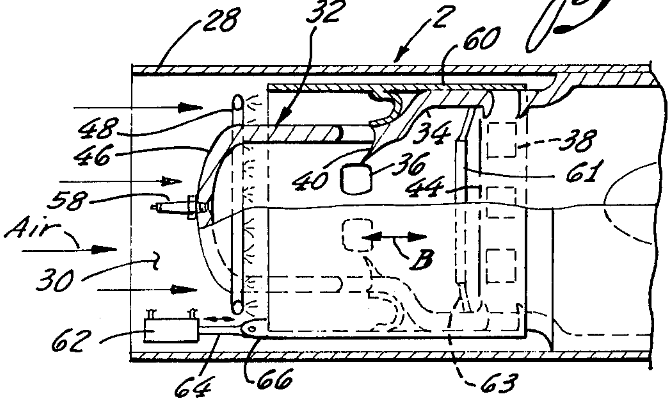
FIG. 6 is a detail view of a burner in partial section in which a valve portion is moved axially with respect to the burner in varying the degree of the openings through first and second sets of apertures in the burner wall.

In a further embodiment of the burner construction, as shown in FIG. 6, a slideable imperforate valve member 60 is employed which is moved axially with respect to the burner wall 34 to control the extent of the openings through a first set of apertures 36 and a second set of apertures 38. The position of the valve member 60 may be controlled through a control rod 64 attached to the valve member through mounting 66. The position of the rod 64 is determined by a control means 62 which may, for example, be a servo motor. By movement of valve member 60 with respect to the burner wall 34, the split or bypass of the incoming air may be varied to control the fuel to air ratio within the combustion zone of the burner. As in FIG. 5, the combustion zone lies to the left of the broken line 44 while the dilution zone lies to the right.

As illustrated in FIG. 6, the valve member 60 has been moved to the right in the direction of the arrow B to close the apertures 38. As the apertures 38 are closed, the apertures 36 are opened so that all of the incoming air is directed to the combustion zone of the burner. This causes a reduction in the fuel to air ratio within the combustion zone.

Figure 7:
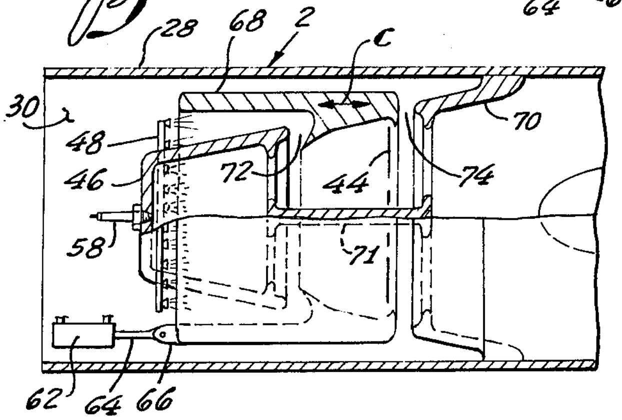
FIG. 7 is a detail view of a burner construction in partial section in which a movable wall portion of the burner is moved axially in varying the width of a pair of openings into the interior of the burner.

In a further burner embodiment, as shown in FIG. 7, a movable burner wall portion 68 is positioned to define a front opening 72 positioned adjacent the combustion zone of the burner 2 and a rear opening 74 positioned adjacent the dilution zone of the burner. As before, the combustion zone is shown as lying to the left of the broken line 44 with the dilution zone lying to the right. The burner nose portion 46 is supported centrally of the shroud 28 by a supporting structure 70 in which a central hub 71 is joined to the burner nose portion 46. A control rod 64 is connected to the movable wall portion 68 through a bracket 66 and is controlled by a control means 62 such as a servo motor. As the wall portion 68 is moved in one direction or another along the direction of the arrow C, the extent of the openings 72 and 74 is varied to vary the flow split of the incoming air between the combustion zone and the dilution zone of the burner.

Figure 8:
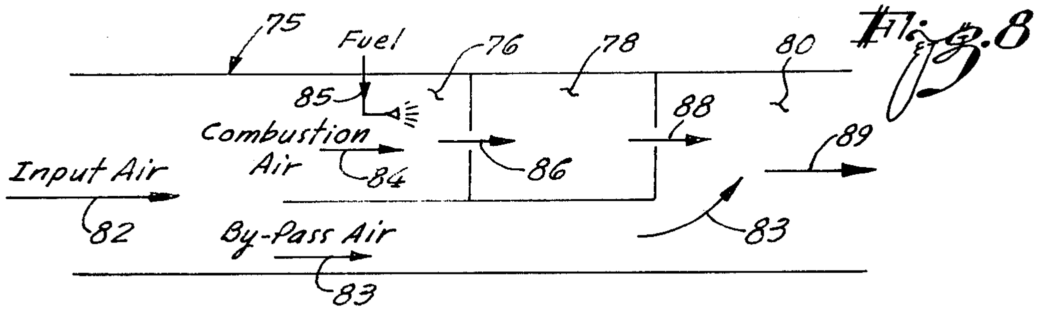
FIG. 8 is a schematic flow diagram illustrating the mixing region, the combustion zone and the dilution zone of a burner.

FIG. 8 illustrates schematically the relationship which may result between a mixing region 76, a combustion zone 78 and a dilution zone 80 in a burner generally designated 75 according to the present invention. As shown, an input air stream 82 is split into a combustion air stream 84 and a bypass air stream 83. The combustion air stream 84 is mixed with a fuel stream 85 in the mixing zone 76 which is positioned forwardly of the combustion zone 78. The mixed fuel-air stream 86 then enters the combustion zone 78 where it is burned and exits as a combustion gas stream 88. The combustion gas stream 88 is then mixed with the stream of by-pass air 83 to form an exhaust gas stream 89 that may be fed to a gas turbine. By controlling the flow split of the air stream 82 into a combustion air stream 84 and bypass air stream 83, the fuel-to-air ratio in steam 86 may be controlled to maintain stable combustion conditions below a combustion temperature of about 3000° F under conditions which exceed lean blowout to a degree sufficient to reduce formation of carbon monoxide and unburned hydrocarbons. If desired, the mixing region 76 need not be associated with the burner 75 and mixing may be done in a separate piece of equipment which is not a part of the burner.

Figure 9:
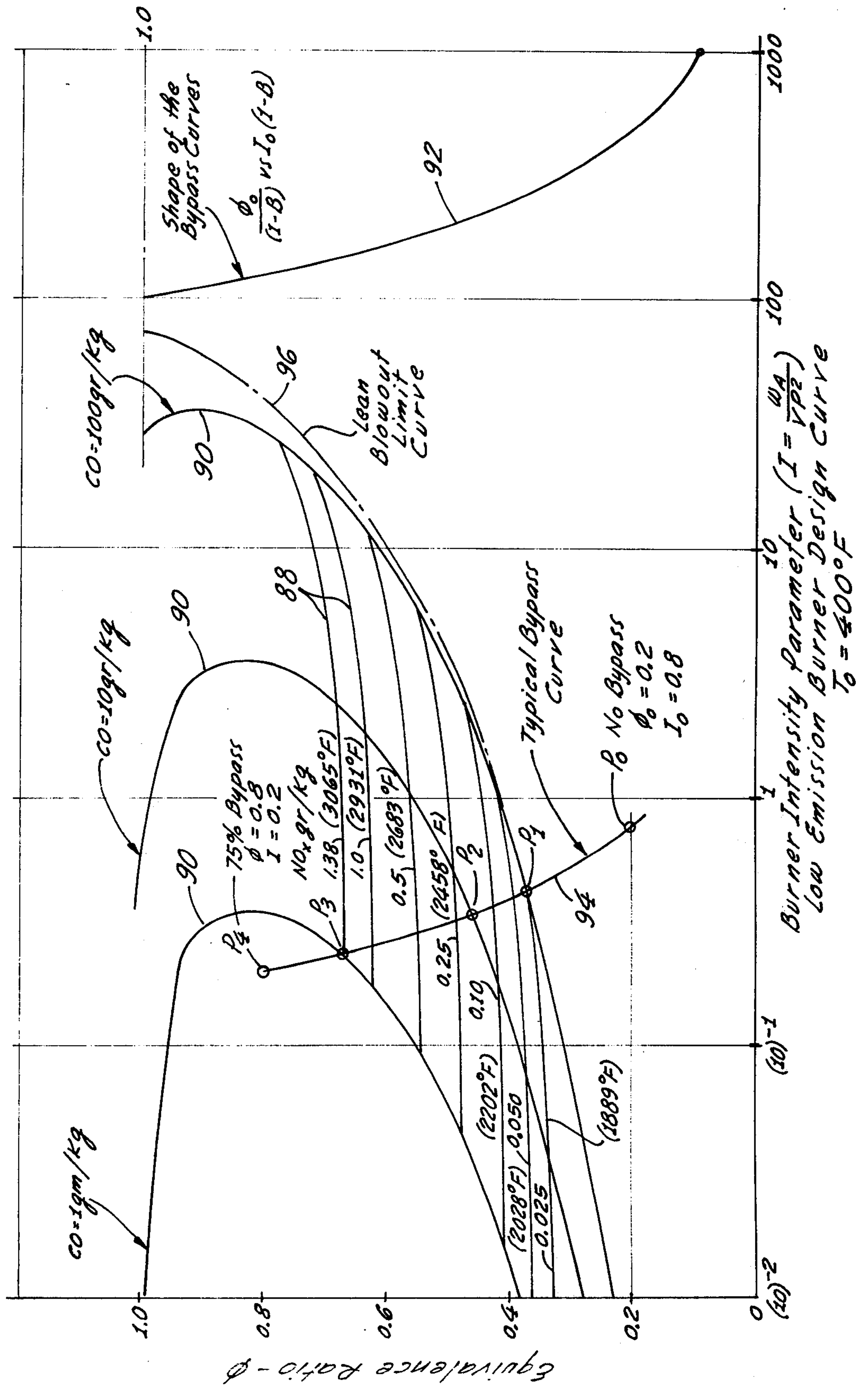
FIG. 9 is a curve illustrating, for a particular incoming air temperature, the effect on the nitrogen oxide and carbon monoxide levels in the exhaust gases of splitting the incoming air to the burner and diverting or bypassing a portion of the incoming air to a dilution zone positioned downstream from the combustion zone.

The functioning of a burner in accord with the present invention is illustrated in FIG. 9 which shows a low emission burner design curve in which the temperature of the input air to the burner is 400° F. The equivalence ratio, $\phi$, which is equal to the fuel to air ratio within the burner divided by the fuel to air ratio under stoichiometric conditions, is plotted vertically while the burner intensity parameter (I) is plotted horizontally. The burner intensity parameter is equal to the flow rate of air to the combustion zone in pounds per second ($W_A$) divided by the volume of the combustion zone (V) in cubic feet multiplied by the static pressure squared ($P^2$) within the burner expressed in atmospheres. Substantially horizontal lines 88 on the curve represent constant nitrogen oxide values in the exhaust gases expressed in grams of nitrogen oxides per kilogram of consumed fuel. Thus, the uppermost line 88 represents nitrogen oxide values of 1.38 grams per kilogram of consumed fuel with a combustion temperature of about 3065° F. Moving downwardly, the next line 88 represents a nitrogen oxide content in the exhaust gases of 1.0 gram per kilogram of consumed fuel and a combustion temperature of about 2931° F. Progressing downwardly to the next line 88 and the next, etc., it will be seen that the nitrogen oxide levels are progressively reduced as the combustion temperature is reduced.

A line 96 on the curve represents the lean blowout limit. The lean blowout limit line 96 is of major importance in operating a burner in accordance with the present invention since the line 96 demarks the limiting conditions under which combustion can be achieved. In the area below line 96, stable combustion cannot be achieved while in the area above the line 96, combustion can be achieved. In the area immediately adjacent to line 96 and above it, the combustion will be ragged. Thus, it is not desirable to operate the burner in this region. Progressing upwardly, away from the lean blowout limit line 96, the combustion becomes stable and it is in this region where the burner is operated.

Superimposed on FIG. 9 are a series of lines 90 which represent constant carbon monoxide levels in the exhaust gases. The line 90 at the left of the curve in FIG. 9 represents a constant level of carbon monoxide in the exhaust gases of 1 gram per kilogram of consumed fuel. Moving to the right, the next line 90 represents a constant carbon monoxide level of 10 grams per kilogram of consumed fuel. Moving still further to the right, the next line 90 represents a constant carbon monoxide level in the exhaust gases of 100 grams per kilogram of consumed fuel. The line 90 which lies farthest to the right approaches closely to the lean blowout limit line 96.

In operating a burner in accord with the present invention, it may be necessary to bypass or divert a portion of the incoming air to a dilution zone which is positioned downstream and in flow communication with the combustion zone. By diverting or bypassing a portion of incoming air, the fuel-to-air ratio within the combustion zone is controlled, and the burner is operated efficiently in producing exhaust gases having a relatively low content of nitrogen oxides and carbon monoxide.

Lines representing a constant level of unburned hydrocarbons in the exhaust gases are not shown in FIG. 9. In a combustion reaction with good mixing in which the burner walls are relatively hot and the combustible mixture is substantially uniform and homogeneous, the content of unburned hydrocarbons in the exhaust gases is related to the content of carbon monoxide in the exhaust gases. It has been found in these burners that acceptable levels of carbon monoxide are associated with acceptable levels of unburned hydrocarbons. Conversely, unacceptably high levels of unburned hydrocarbons are found to be accompanied by unacceptable levels of carbon monoxide. Thus, in describing the present invention, the operation of the burner or combustion process has been described with reference to the content of nitrogen oxides and carbon monoxides in the exhaust gases. It should be understood, however, that the content of unburned hydrocarbons is substantially reduced to a low level when the combustion process is conducted to produce a low level of carbon monoxide in the exhaust gases.

The shape of a typical bypass curve is shown at 92. The original equivalents ratio, $\phi_o$, is the ratio of the fuel introduced to the combustion zone to the weight of all the incoming air divided by the fuel-to-air ratio under stoichiometric conditions. The original equivalence ratio, $\phi_o$, is divided by the factor (1-B) with B representing the fraction of the incoming air which is bypassed to the dilution zone to vary the actual equivalence ratio (as opposed to the original equivalence ratio) within the combustion zone.

Plotted horizontally in determining the curve 92 is the original burner intensity parameter $I_o$ which is equal to the flow rate of all the incoming air in pounds per second ($W_A$) divided by the volume of the burner in cubic feet (V) multiplied by the square of the static pressure ($P^2$) within the burner expressed in atmospheres. The original burner intensity parameter $I_o$, as defined, is multiplied by the factor (1-B) with B representing the fraction of the air which is bypassed or diverted to the dilution zone in varying the actual burner intensity parameter (I) within the combustion zone.

As shown in FIG. 9, the curve 92 does not intersect the lean blowout limit line 96 to pass into the area above line 96 where stable combustion occurs. This indicates that the original equivalence ratio ($\phi_o$) of 0.1 and the original burner intensity parameter ($I_o$) of 1000, i.e., with no bypass, will not produce stable combustion even if a large portion of the incoming air is bypassed to the dilution zone. To produce stable combustion it would be necessary to move the curve 92 to the left as shown in FIG. 9 so it would intersect the lean blowout limit line 96 and pass into the area above line 96 where stable combustion takes place. This can be accomplished, for example, by increasing the volume of the burner which reduces the burner intensity parameter to move the curve 92 to the left in FIG. 9.

A specific bypass curve is shown as 94 in FIG. 9 to demonstrate the effect of bypassing a portion of the incoming air to the dilution zone on the combustion efficiency and the content of nitrogen oxides and carbon monoxide in the burner exhaust gases. The point $P_o$ represents the combustion condition where there is no bypass and is determined by the original equivalence ratio ($\phi_o$) of 0.2 and the original burner intensity parameter ($I_o$) of 0.8. As shown, the point $P_o$ is not a stable operating point for the burner.

The point $P_1$ on line 94 corresponds to the burner condition where 47% of the total incoming air is bypassed or diverted to the dilution zone. The point $P_1$ lies on the lean blowout limit line 96 and also on the constant CO line 90. This indicates that the combustion is marginally stable at point $P_1$ with an unacceptably high carbon monoxide level in the exhaust gases of 100 grams per kilogram of consumed fuel. Also, as indicated by the lowermost horizontal line 88, the point $P_1$ corresponds to a nitrogen oxide level in the exhaust gases of 0.025 grams per kilogram of consumed fuel and a combustion temperature of about 1,889° F.

Moving up the line 94 to point $P_2$, this point represents the combustion condition where 56.6% of the incoming air is bypassed or diverted to the dilution zone. At this point, the carbon monoxide emission level is 10 grams per kilogram of consumed fuel and the nitrogen oxide level is about 0.18 grams per kilogram of consumed fuel. Point $P_2$ represents the approximate minimum bypass ratio that can be used without exceeding a carbon monoxide emission level that is compatible with the 1976 Federal Standards for automotive emission of carbon monoxide.

Moving further up the line 96 to point $P_3$, this point represents a condition where 70% of the incoming air is bypassed or diverted to the dilution zone. At point $P_3$, the nitrogen oxide content of the exhaust gases is 1.38 grams per kiloram of consumed fuel while the carbon monoxide content of the exhaust gases is 1.03 grams per kilogram of consumed fuel. At this point, the burner is operating at a combustion temperature of about 3,000° F., i.e. 3.065° F. Point $P_3$ represents the approximate maximum bypass ratio which can be used without exceeding a nitrogen oxide emissions level that is compatible with the 1976 Federal Standards for automotive emission of oxides of nitrogen.

Moving still further up the line 94 to point $P_4$, this point represents a bypass of 75% with an equivalence ratio in the combustion zone of 0.8 and a combustion intensity parameter of 0.2. The combustion condition represented by point $P_4$ is not satisfactory because, as shown, it produces nitrogen oxide levels in the exhaust gases which are unacceptably high. Thus, as demonstrated by the bypass line 94, the limiting conditions for operating the burner satisfactorily in producing acceptable levels of nitrogen oxides and carbon monoxide is represented by the portion of line 94 between the points $P_2$ and $P_3$.

In operating a burner to drive a gas turbine, the operating conditions of the burner may change in response to changes in the power demands of the turbine. Thus, for example, if the turbine is used to drive an automobile, the fuel supplied to the burner may be increased when the automobile is accelerating or decreased when the automobile is decelerating. As the fuel rate is increased or decreased, the position of a point $P_o$ representing the burner conditions in terms of total fuel flow and total air flow (FIG. 9) may change. This then establishes a new reference point $P_o$ and the degree of bypass required to provide satisfactory low emission combustion with respect to the new reference point may have to be varied from what it was for the previous reference point $P_o$.

The calculations used in determining the constant CO, lines 90 in FIG. 9, are on the conservative side and, in practice, the carbon monoxide levels may be slightly lower than the values indicated by lines 90. The lines in FIG. 9 are valid, however, in illustrating what actually takes place in the combustion process when the fuel-to-air ratio within the combustion zone is varied by varying bypass of air to the dilution zone.

Figure 10:
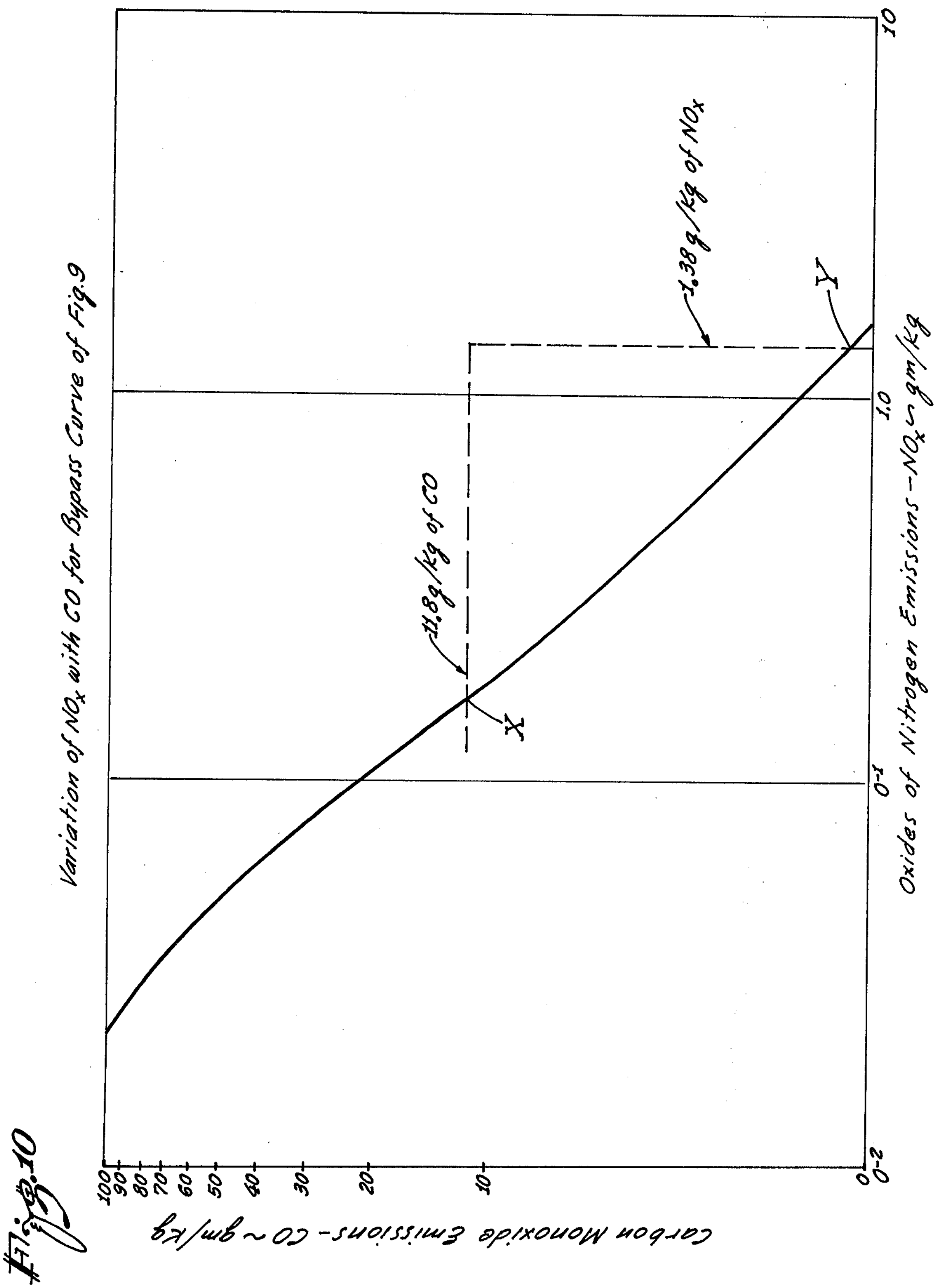
FIG. 10 illustrates the variation in nitrogen oxide levels with respect to variation in the carbon monoxide levels using the various degrees of bypass illustrated in FIG. 9.

FIG. 10 is a plot of the variation in the nitrogen oxide levels with respect to the carbon monoxide levels in the exhaust gases using the bypass line or curve 94 shown in FIG. 9. As illustrated, the acceptable levels of carbon monoxide and nitrogen oxides are represented by the portion of the curve between points X and Y. Between these points, all of the values on the curve represent acceptable carbon monoxide levels and acceptable nitrogen oxide levels in the exhaust gases. Thus, in controlling combustion under the conditions imposed by the reference point $P_o$ and bypass line 94 of FIG. 9, the quantity of air which is bypassed is chosen to produce carbon monoxide and nitrogen oxide levels between the points X and Y on the curve of FIG. 10.

Figure 11:
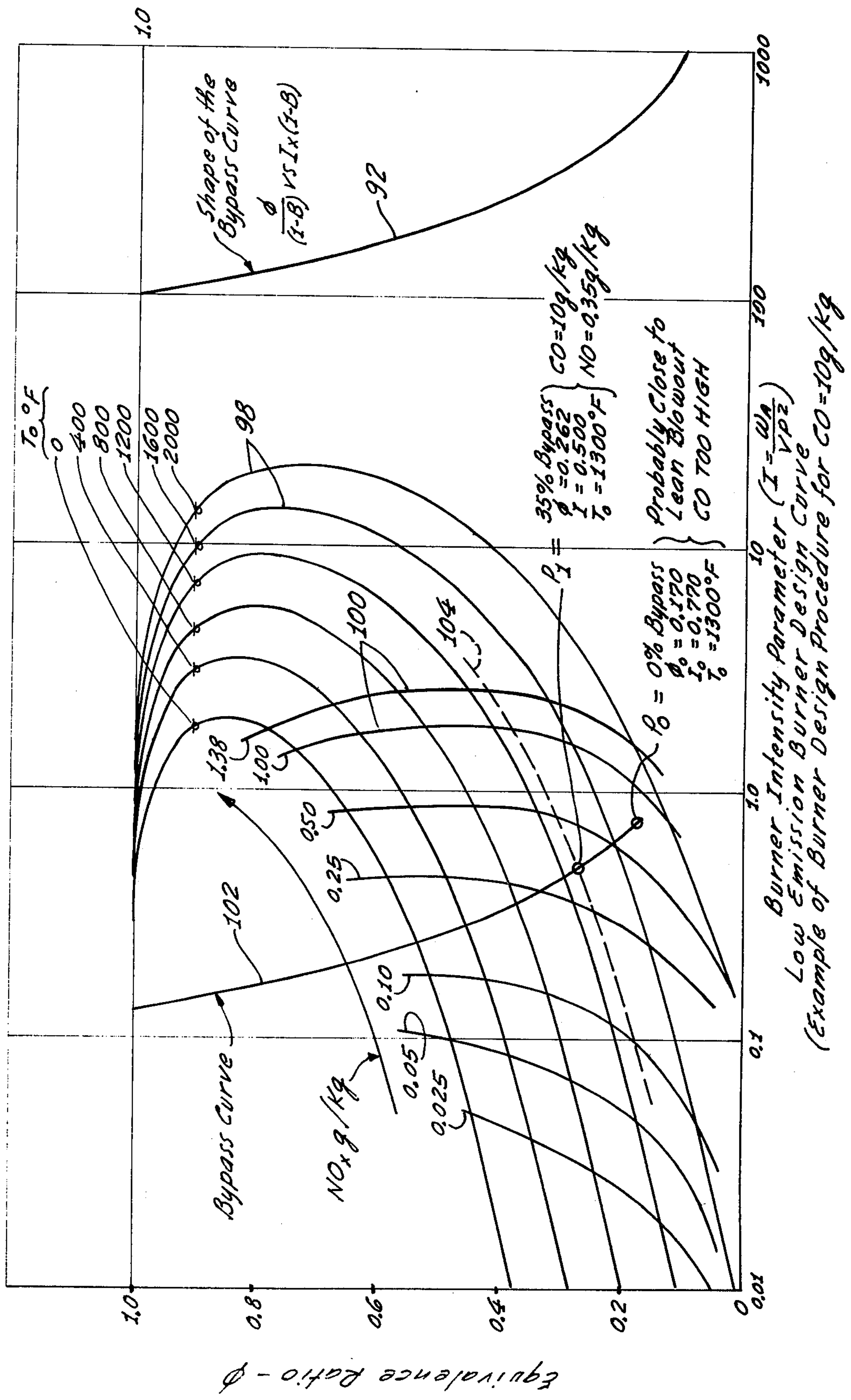
FIG. 11 is a curve illustrating, for a particular carbon monoxide level, the effect of bypassing or diverting a portion of the incoming air to a dilution zone in terms of the temperature of the incoming air and the nitrogen oxide level in the exhaust gases.

FIG. 11 illustrates the effect of the temperature of the incoming air to the burner on the method of operating a burner in accord with the present invention. In the curve of FIG. 11, the equivalence ratio, $\phi$, is plotted vertically while the burner intensity parameter, I, is plotted horizontally in the same manner described in regard to FIG. 9. Superimposed on the Figure is a family of lines 98, each of which represents a constant carbon monoxide content in the exhaust gases of 10 grams for each kilogram of consumed fuel using input air having the denoted temperature in degrees Fahrenheit.

The lines 100 connect the points of constant nitrogen oxide content which lie on lines 98. Thus, the line 100 which is farthest to the right in FIG. 11 connects the points on each of the lines 98 where the nitrogen oxides level in the exhaust gases is 1.38 grams per kilogram of consumed fuel. It should be understood that the lines 100 are only valid in representing nitrogen oxide levels at their points of intersection with the constant carbon monoxide level lines 98. Actually, as shown in FIG. 9, the lines of constant nitrogen oxide levels for a given temperature of the inlet air are horizontal lines and do not run vertically as do the lines 100 in FIG. 11.

The line 102 in FIG. 11 illustrates a bypass curve in which the original equivalence ratio $\phi_o$ — with zero percent bypass — is 0.170 and the original burner intensity parameter, $I_o$, is 0.770. In this particular case, the temperature of the inlet air is 1,300° F. It can be seen that the point $P_o$ falls to the right of the dotted line 104 which represents a constant carbon monoxide content in the exhaust gases of 10 grams per kilogram of consumed fuel and an inlet air temperature of 1,300° F. This indicates that the carbon monoxide emissions may be excessive unless a portion of the input air is bypassed. Also, the combustion conditions represented by the point $P_O$ may actually fall below the lean blowout line. However, from the data presented in FIG. 11, this cannot be determined and it would be necessary to refer to a curve as illustrated in FIG. 9 which is specific to the combustion conditions where the temperature of the input air is 1,300° F.

Moving up the line 102, the line intersects line 104 at point $P_1$. At point $P_1$, 35% of the incoming air is bypassed directly to the dilution zones to provide an equivalence ratio within the combustion zone of 0.262 and a burner intensity parameter within the combustion zone of 0.500. At this point, the carbon monoxide level in the exhaust gases is 10 grams per kilogram of consumed fuel and the nitrogen oxide content of the exhaust gases is 0.35 grams per kilogram of consumed fuel. The nitrogen oxide level in the exhaust gases under the combustion conditions represented by point $P_1$ may be determined by interpolating along the line 104 between the points where line 104 crosses the lines 100 representing nitrogen oxide contents of 0.25 and 0.50 grams of nitrogen oxides per kilogram of consumed fuel. As indicated by the location of point $P_1$, the combustion conditions at this point are satisfactory since both the carbon monoxide and nitrogen oxide levels in the exhaust gases are within the emission levels set by the 1976 Federal Standards. Thus, point $P_1$ represents a satisfactory burner operating condition which indicates that at least 35% of the incoming air should be bypassed when the original equivalence ratio is 0.170, the original burner intensity parameter is 0.770 and the air inlet temperature is 1,300° F.

As shown in FIG. 12, various instruments may be placed on the burner 2 to control the flow split or bypass of the incoming air between the first apertures 36 leading to the combustion zone and the second apertures 38 leading to the dilution zone. A fuel flow meter 104 may be positioned in the fuel passage 12 to provide an output signal $W_F$ whose magnitude is equal to the flow rate of the fuel in pounds per second. An air flow sensor 106 positioned within the interior of the burner 2 senses the pressure $P_2$ of the air after it passes through aperatures 38 while an air flow sensor 108 positioned upstream from the apertures 38 senses the pressure of the air before it passes through the apertures. The signals from air flow sensors 106 and 108 are fed to an air flow meter 110 through instrument lines 112 and 114.

A temperature sensor 116 may be positioned in the incoming air stream to provide a signal which is transmitted through a line 118 with the magnitude of the signal $T_A$ indicating the temperature of the incoming air in degrees Rankine. A line 120 transmits the signal $T_A$ representing the temperature of the incoming air to the air flow meter 110 which translates the temperature of the incoming air and its pressure drop through the second apertures 38 into a signal $W_A$ representing the air flow rate in pounds per second. A second output signal from the air flow meter 110 represents the pressure $P_2$ of the incoming air at sensor 106 downstream from the second apertures 38.

A temperature sensor 122, which may be a high temperature thermocouple, may be positioned within the combustion zone of the burner 2 and transmits an output signal through a line 124 to a temperature reader 126. The temperature reader 126 generates an output signal which is proportional to the combustion temperature T.

A gas sample probe 128 is positioned in the exhaust gases from the burner and conducts the exhaust gases to a standard nitrogen oxides analyzer 130 and a carbon monoxide analyzer 132. The analyzers 130 and 132 generate output signals $NO_p$ and $CO_p$ which are proportional to the content of nitric oxide and carbon monoxide in parts per million in the exhaust gases.

A control rod 135 connected to a movable wall portion 137 of the burner 2 by any suitable means controls the extent of the openings through the first apertures 36 with respect to the extent of the openings through the second apertures 38. The control rod 135 is positioned by a positioning motor 134 with the position of the motor determined by an error signal E which is generated by the combustion parameters that are sensed to move the rod 135 and movable wall portion 137 to whatever position is desired in controlling the flow split or degree of bypass and the level of nitric oxide and carbon monoxide in the exhaust gases from the burner. A control rod position sensor 136 senses the positon of the control rod 135 and generates an output signal X which indicates the position of control rod 135.

Turning to FIG. 13, there is illustrated a conventional circuit which may be utilized in determining the air flow rate in pounds per second. The air flow rate may be determined mathematically by multiplying a constant K times the square root of the fraction $P_1(P_1 - P_2)/T_A$. The control signals fed to the circuit are represented by $T_A$ which indicates the inlet air temperature in degrees Rankine, $P_1$ which indicates the pressure of the inlet air, and $P_2$ which indicates the pressure of the inlet air after passing through the second apertures 38. The signal $P_2$ is subtracted from the signal $P_1$ in the operational amplifier 138 with the output signal fed to an amplifier 140 where it is multiplied by the signal representing $P_1$. The signal from amplifier 140 is then divided by the signal $T_A$ in amplifier 142 and the output is fed to an amplifier 144 which includes a feedback loop to convert the signal to a signal representing the square root of the original signal. The output from the amplifier 144 is then multiplied by a constant K in the amplifier 146 to generate an output signal $W_A$ which indicates the air flow rate into the burner in pounds per second. The circuit represented by FIG. 13 may be employed in the air flow rate meter 110 which is shown generally in FIG. 12.

Turning to FIG. 14, there is illustrated a control circuit for controlling the position of the movable wall portion 137 in FIG. 12 in response to the nitrogen oxides level in the burner exhaust gases. As shown, a signal $W_A$ and a signal $W_F$, representing the air flow rate into the burner in pounds per second and the fuel flow rate into the burner in pounds per second are fed to an operational amplifier 148 where these signals are added. The output signal from amplifier 148 is then multiplied by a signal $NO_p$ from the nitrogen oxide analyzer 130 shown in FIG. 12 which represents the nitrogen oxides content in parts per million in the burner exhaust gases. The output from amplifier 150 is then multiplied by a constant K which is indicated as 0.001586 in an amplifier 152 and the output from amplifier 152 is divided in amplifier 157 by the signal $W_F$ representing the fuel flow rate in pounds per second. The output from the amplifier 157 which represents the nitrogen oxides content in grams per kilogram of consumed fuel in the exhaust gases from the burner is then compared in amplifier 154 with a generated signal $NOG_{(lim)}$ which represents a predetermined level of nitrogen oxides in grams per kilogram of consumed fuel which is desired in the burner output gases. By subtracting one signal from the other in the operational amplifier 154, an error signal E is generated which is fed to the positioning motor 134, as shown in FIG. 12, to move the movable wall portion 137 in one direction or another in producing a level of nitrogen oxides in the burner exhaust gases which is the same as the desired nitrogen oxides level $NOG_{(lim)}$.

Figure 15:
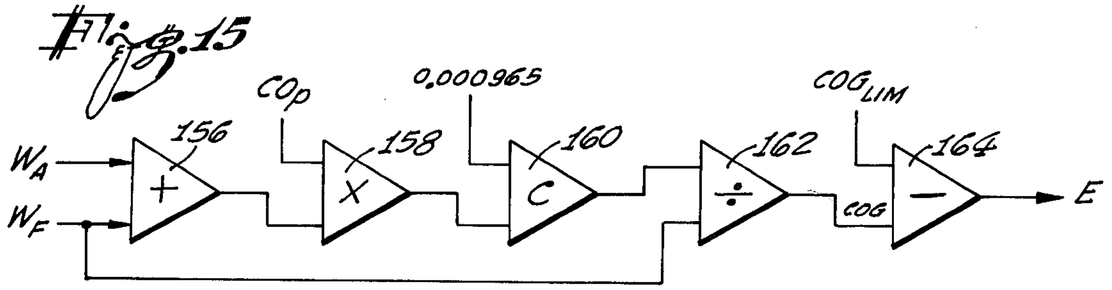
FIG. 15 is a diagram of a circuit for controlling the flow split of the incoming air in response to the carbon monoxide content in the burner exhaust gases.

A circuit is illustrated in FIG. 15 in which the carbon monoxide level in the exhaust gases may be used to control the position of the moveable wall portion 137 shown in FIG. 12. Output signals $W_A$ and $W_F$ are added in an operational amplifier 156 and their sum is then multiplied in amplifier 158 by a signal $CO_p$ which is received from the carbon monoxide analyzer 132 shown in FIG. 12 and represents the carbon monoxide level in the burner exhaust gases in parts per million. This product is then multiplied by a constant K illustrated as 0.00965 is an amplifier 160 and the output signal is divided by the signal $W_F$ in amplifier 162 to produce a signal COG representing the carbon monoxide content in the burner exhaust gases in grams of carbon monoxide per kilogram of consumed fuel. This signal is then compared in an amplifier 164 with a signal $COG_{(lim)}$ representing the desired level of carbon monoxide in the burner exhaust gases in grams of carbon monoxide per kilogram of consumed fuel. By subtracting the one signal from the other in amplifier 164, an error signal E is generated which is fed to the positioning motor 134 to move the movable wall portion 137 in one direction or another to control the fuel to air ratio within the combustion zone in producing a carbon monoxide level COG in the burner exhaust gases which is the same as the predetermined carbon monoxide level $COG_{(lim)}$.

If desired, the control circuits shown in FIGS. 14 and 15 may be combined with the error signal E generated by the circuit of FIG. 14 always being either positive or 0 and being positive when the nitrogen oxide content NOG in the burner exhaust gases exceeds a predetermined nitrogen oxide content $NOG_{(lim)}$. The error signal E generated by the circuit of FIG. 15 is then always either negative or 0 and is negative when the carbon monoxide content COG in the exhaust gases is greater than a predetermined carbon monoxide level $COG_{(lim)}$. By thus combining the circuits, the positioning motor 134 receives a positive signal to move the control rod 135 in one direction when the nitrogen oxides content of the exhaust gases exceeds a predetermined level to decrease the fuel to air ratio within the combustion zone and lower the combustion temperature. When the carbon monoxide level in the exhaust gases exceeds a predetermined level $COG_{(lim)}$, the positioning motor 134 receives a negative signal which moves the movable wall portion 137 in the opposite direction so as to increase the fuel to air ratio within the combustion zone and to increase the combustion temperature while reducing the carbon monoxide level in the exhaust gases. With combinations of nitrogen oxides and carbon monoxide in the exhaust gases which do not exceed either of the limits imposed by the circuits of FIGS. 14 and 15, the combined error signal E is 0 and there is no movement of the positioning motor 134.

Figure 16:
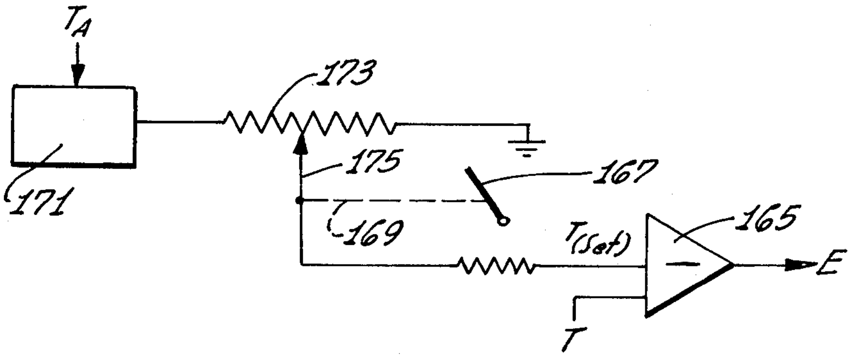
FIG. 16 is a diagram of a circuit for controlling the flow split of the incoming air in response to the difference between the temperature within the burner combustion zone and the desired temperature ($T_{set}$) within the burner combustion zone.

FIG. 16 illustrates a simplified form of circuit for controlling the flow split of incoming air between the combustion zone and dilution zone of the burner. The combustion temperature T, which may be measured with a sensor 122 (FIG. 12) is compared with a predetermined temperature $T_{(set)}$ in an amplifier 165 to generate a positive or negative error signal E which is fed to a positioning motor 134 (FIG. 12). On actuation of the motor 134, the air flow to the combustion zone is increased to reduce the combustion temperature or decreased to increase the combustion temperature through movement of rod 135 and wall portion 137.

In practice, the combustion zone of the burner may operate at a relatively constant temperature, such as 2,500° F, in operating a gas turbine under steady state conditions such as providing power for an automobile at cruising speed. When the turbine is accelerating or decelerating (as occurs in driving an automobile) the burner may have an entirely different set of operating conditions. To reduce engine lag during acceleration and deceleration, the desired burner combustion temperature, $T_{set}$, may be relatively high, e.g. 2,650° F, for acceleration and relatively low, e.g. 2,350° F, during deceleration. The position and rate of movement of the engine throttle 167 is a good indicator of acceleration and deceleration conditions and may be used to control $T_{set}$. Thus, if the automobile is at cruising speed with $T_{set}$ at 2,500° F, the movement of the throttle pedal 167 to accelerate the turbine may be transmitted through a link mechanism 169 to increase $T_{set}$ to 2,650° F. When the engine has accelerated to its new speed and the throttle 167 is cut back, the link mechanism 169 resets the temperature $T_{set}$ at 2,500° F for continued steady state operation. During deceleration, the link mechanism 169 sets the temperature $T_{set}$ at a low temperature, such as 2,350° F, which may be maintained until the engine decelerates to the desired speed when $T_{set}$ is reset for 2,500° F for continued steady state operation. During cold start conditions, the burner inlet air temperature may be low and the burner combustion temperature must be relatively high, such as 2,900° F. The inlet air temperature sensor 116 (FIG. 12) may, for example, be used to set the desired combustion temperature $T_{set}$ at 2,900° F for cold start. When the inlet air temperature rises by passing through a heat exchanger heated by the turbine exhaust gases after operation of the burner for a relatively short period of time, the temperature $T_{set}$ may be returned to 2,500° F for continued operation.

During engine idle condition, the burner combustion temperature will be relatively low, e.g. 2,350° F. The temperature $T_{(set)}$ under these conditions may also be controlled by the link mechanism 169 to the engine throttle 167. For example, the engine throttle may be biased to an extended position at idle condition which changes the temperature $T_{(set)}$ to 2,350° F.

A suitable control device for regulating $T_{(set)}$ is shown in FIG. 16. A voltage bias control 171 is regulated by the inlet air temperature $T_A$ to increase the voltage under cold start conditions and supplies a reference voltage to a potentiometer 173. The position of the potentiometer arm 175 is controlled through a link mechanism 169 by the position of the throttle pedal 167. A predetermined reference signal representing the desired combustion temperature $T_{(set)}$ is, thus, generated with the magnitude of the signal depending on whether the engine is at cruising speed, at idle, under acceleration or under deceleration. The position of the arm 175 may also be controlled by sensing the signal being used to control the inlet temperature into the turbine. This in turn involves the engine control system which is independent of the burner control system under discussion here.

Figure 17:
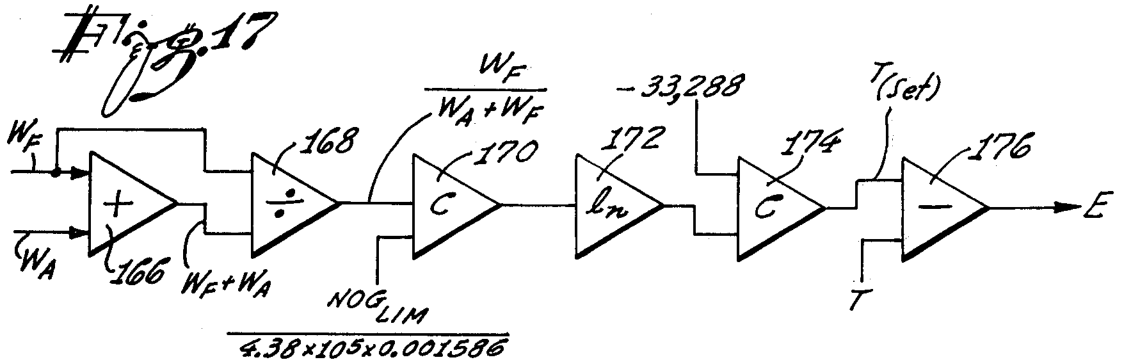
FIG. 17 is a diagram of a circuit for controlling the flow split of the incoming air in response to the temperature within the burner combustion zone to provide exhaust gases having a predetermined nitrogen oxides content.

Turning to FIG. 17, the positioning motor 134 shown in FIG. 12 may also be controlled by sensing the combustion temperature T within the combustion zone and comparing it with a predetermined combustion temperature $T_{(set)}$ which is the determined temperature required to maintain a predetermined level of nitrogen oxides $NOG_{(1im)}$ in the burner exhaust gases. As shown, a signal $W_F$ and a signal $W_A$ representing respectively the fuel flow in pounds per second and the air flow in pounds per second are added in an operational amplifier 166 with the output then being divided in an amplifier 168 by the signal $W_F$ to produce an output signal which is multiplied by a constant in an amplifier 170 with the constant being determined by the desired nitrogen oxide content $NOG_{(1im)}$ in the burner exhaust gases. The product signal is then conveyed to an amplifier 172 which converts the signal to its logarithm. The output logarithm signal from amplifier 172 is then multiplied by a constant in an amplifier 174 to produce an output signal $T_{(set)}$ which indicates the required combustion temperature (given the fuel rate $W_F$ and air rate $W_A$) to provide the predetermined nitrogen oxides content ($NOG_{(1im)}$ in the burner exhaust gases. This signal is then compared with a signal T representing the actual combustion temperature in an amplifier 176 to generate an error signal E. The error signal E is fed to the positioning motor 134 to vary the fuel to air ratio within the combustion zone in controlling the combustion temperature at the predetermined temperature $T_{(set)}$ required for the desired nitrogen oxides content in the exhaust gases. When temperatures T and $T_{set}$ are the same, the error signal E becomes 0 and movement of the positioning motor 134 ceases.

Figure 18:
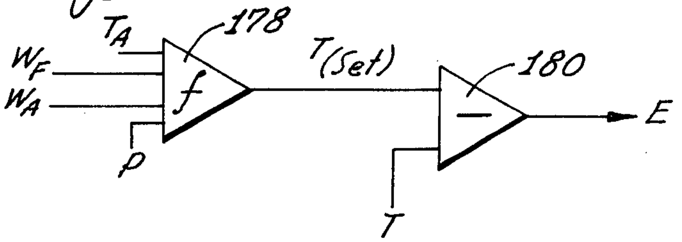
FIG. 18 is a diagram of a circuit for controlling the flow split of the incoming air in response to the temperature within the burner combustion zone to provide exhaust gases having a predetermined carbon monoxide content.

FIG. 18 illustrates a control circuit which may be used to control the combustion temperature at a calculated temperature $T_{(set)}$ that is required to produce a given content of carbon monoxide in the burner exhaust gases. A signal $T_A$ representing the temperature of the inlet air to the burner in degrees Rankine, a signal $W_F$ representing the fuel flow rate to the burner in pounds per second, a signal $W_A$ representing the air flow rate to the burner in pounds per second, and a signal P representing the static pressure in atmospheres within the burner are fed to a function generator 178 which is programmed to calculate a combustion temperature $T_{(set)}$ required for a predetermined level of carbon monoxide in the exhaust gases. The function generator 178 is programmed with information concerning the interrelation between the parameters $T_A$, $W_A$ and P in producing carbon monoxide in the exhaust gases as determined by the c u r v e s a s illustrated in FIG. 9. The generated signal $T_{(set)}$ is then compared with a signal T representing the actual combustion temperature in an amplifier 180 to generate an error signal E that is directed to the positioning motor 134 to move the control rod 135 in one direction or another to vary the fuel to air ratio within the combustion zone. As the fuel to air ratio is varied, the function generator 178 generates a new temperature $T_{(set)}$ which is then compared with a new combustion temperature T with the two temperatures being compared until both temperatures are the same. The error signal E then becomes zero and movement of the positioning motor 134 ceases.

If desired, the circuits illustrated in FIGS. 17 and 18 may be combined in the same manner as described previously with regard to the circuits shown in FIGS. 14 and 15. If combined, the error signal generated by the circuit of FIG. 18 may be set to always be either negative or zero while the error signal from circuit 17 is always positive or zero. The two error signals may then be fed to the positioning motor 134 to move the wall 137 in one direction or another when the level of nitrogen oxides exceeds $NOG_{(1im)}$ to provide a positive error signal or the level of carbon monoxide exceeds a predetermined level to produce a combustion temperature T that is less than $T_{(set)}$ to provide a negative error signal.

Figure 19:
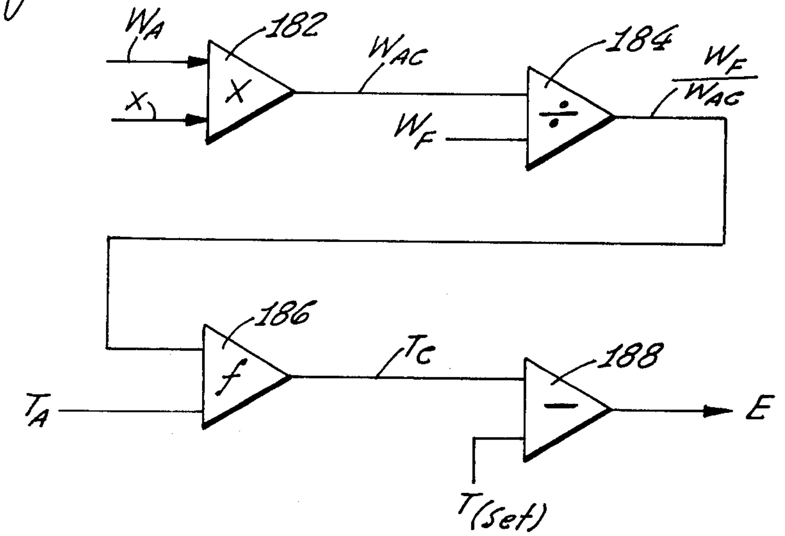
FIG. 19 is a diagram of a circuit for controlling the flow split of the incoming air stream to provide a combustion temperature $T_c$ which is the same as a desired combustion temperature $T_{set}$.

A further control circuit illustrated in FIG. 19 does not require the use of a high-temperature thermocouple element such as the temperature sensor 122 or the use of a nitrogen oxide or carbon monoxide analyzer whose response time may be slower than desired in a given combustion process. As shown, a signal representing the total air flow to the burner in pounds per second $W_A$ is multiplied by a signal X representing the position of control rod 135 (FIG. 12) in an amplifier 182. The signal X may vary from 0 to 1 with 0 representing 100% bypass (all the air entering the dilution zone) and 1 representing no bypass. The product of X and $W_A$ is, therefore, equal to $W_{AC}$ which is the air flow in pounds per second to the combustion zone of the burner. The signal $W_{AC}$ is divided by a signal $W_F$ representing the fuel flow rate in pounds per second in an amplifier 184 to provide a signal $W_F/W_{AC}$ which is equal to the fuel to air ratio in the combustion zone of the burner. The signal $W_F/W_{AC}$ is then fed to a function generator 186 with a signal $T_A$ representing the air inlet temperature in degrees Rankine. From the fuel to air ratio within the combustion zone, which determines the $\Delta$ T of combustion and the inlet air temperature $T_A$, the function generator 186 computes the combustion temperature $T_c$ within the combustion zone of the burner. The signal $T_c$ is then compared with a signal representing the desired combustion temperature $T_{(set)}$ in an amplifier 188 to generate an error signal E that is used, as described previously, to control the flow split of incoming air to the burner. In determining the temperature $T_c$, the pressure P within the burner essentially may be ignored since it is not an important combustion parameter except when operating at very high combustion temperatures, e.g. in excess of 3,000° F.

Figure 20:
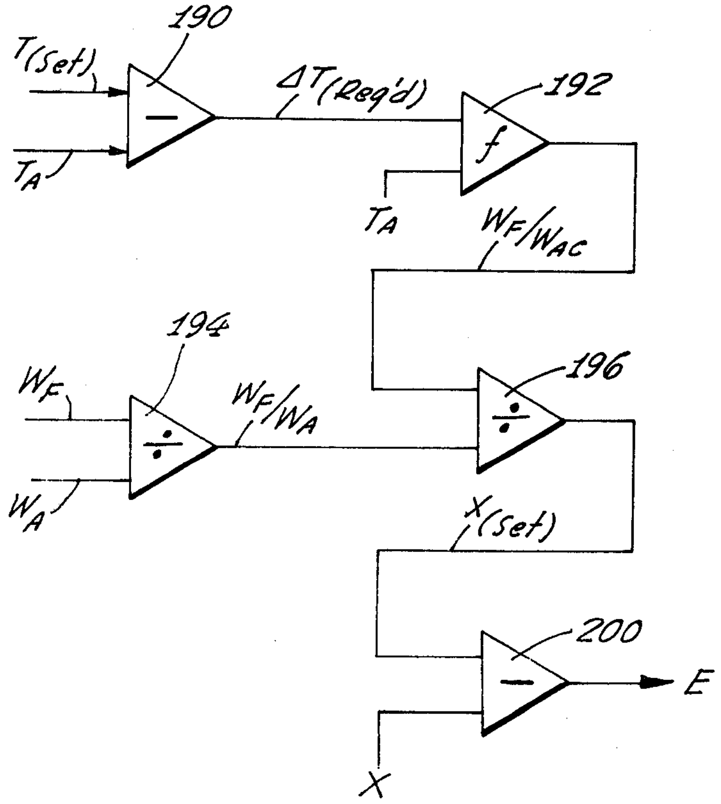
FIG. 20 is a diagram of a circuit for controlling the flow split of the incoming air at a calculated slide setting $X_{(set)}$ to give the desired combustion zone temperature.

In a still further diagram for controlling the flow split of incoming air to the burner, FIG. 20, a signal representing air temperature $T_A$ in degrees Rankine is substracted from a signal representing the desired combustion temperature $T_{(set)}$ in an amplifier 190 to produce a signal representing the required temperature increase, $\Delta T_{Reqd.}$ which is produced within the combustion zone of the burner. The signal $\Delta T_{Reqd}$ and a signal $W_A$ representing the inlet air temperature in degrees Rankine are then fed to a function generator 192 which computes the fuel to air ratio within the combustion zone $W_F/W_{AC}$ that is required to produce $\Delta$T Reqd.

The ratio of the total fuel flow, $W_F$, to the total air flow to the burner $W_A$ (both in pounds per second) is determined in an amplifier 194 and the signal $W_F/W_A$ is then divided by the signal $W_F/W_{AC}$ is an amplifier 196 to determine to desired flow split $X_{(set)}$ (with X ranging from 0 to 100% bypass to 1 for 0% bypass). The signal $X_{(set)}$ also represents the desired position of the control rod 135 (FIG. 12) and is compared with a signal X representing the actual position of control rod 135 in an amplifier 200. This generates an error signal E which provides movement of the control rod 135 in one direction or another to reduce the error signal E to zero.

In the circuits illustrated in FIGS. 19 and 20, the signal $T_{(set)}$ may be generated by any of the procedures illustrated in FIGS. 16–18, e.g. by a desired nitrogen oxides level in the exhaust gases, a desired carbon monoxide level of the exhaust gases, or by predetermined operating temperatures for various burner and engine conditions such as cold start, acceleration, deceleration, etc. Similarly, the signal for the combustion temperature T in the circuits of FIGS. 16–18 may be generated by the means illustrated in FIG. 19 for $T_c$ so that T does not have to be measured directly with a high temperature thermocouple.

As illustrated by the foregoing discussion, the present invention provides a means for obtaining power through a combustion process in which the combustion exhaust gases are surprisingly low in nitrogen oxides, carbon monoxide, and unburned hydrocarbons. In providing this result, the combustion process is conducted to control the combustion parameters in maintaining the combustion temperature at about 3,000° F or less under stable combustion conditions which sufficiently exceed lean blowout to provide a reduced content of carbon monoxide in the exhaust gases of about 12.0 grams or less for each kilogram of consumed fuel. Preferably, the combustion temperatures range from about 2,300 ° to about 2,700° F and most preferably within the range of about 2,400° to about 2,600° F.

Unlike prior combustion processes, the present process operates at very lean fuel to air ratios of about 0.0035 to about 0.035. In previous combustion processes, rich fuel to air ratios were maintained in a primary combustion zone in order to maintain flame stability with the products from the combustion zone then being diluted through introduction of air at secondary or tertiary points downstream from the combustion zone. Unlike these prior processes, the present process maintains very low fuel to air ratios in the combustion zone to obtain combustion gases which may then be diluted within a dilution zone positioned downstream and in flow communication with the combustion zone.

In general, the temperature of the incoming air to the burner will range from about 200° to about 1,800° F during steady state operation of the burner. However, during startup, the inlet air temperature may be much lower such as 0° F or lower. The temperature of the exhaust gases produced by the combustion process of the present invention will preferably range from about 1,300° to about 2,500° F. In utilizing the exhaust gases to drive a gas turbine to power an automobile, the temperature of the exhaust gases is preferably kept at about 2,000° F or lower in view of the limitations of the construction materials used in the turbine. Thus, use of a dilution zone to which a portion of the input air is bypassed is desirable when the burner is supplying exhaust gases to a turbine since the dilution decreases the temperature of the gases before their introduction into the turbine.

Based on the considerations discussed previously in conducting the combustion reaction to reduce the level of nitrogen oxides and carbon monoxide in the exhaust gases, the split or bypass of incoming air to the dilution zone may vary over a wide range from as low as 0% by weight to as high as 95% by weight in achieving stable combustion with low emission levels.

In conventional combustion processes the point of lean blowout can occur at fuel-to-air ratios that yield combustion temperatures of about 2,700° F. However, under the conditions utilized in the present invention, the combustion reaction can be conducted under very lean fuel-to-air ratios in which the limit of lean blowout may be reduced to fuel-to-air ratios that yield combustion temperatures as low as about 2,000° F. In achieving this result, a ceramic burner construction or a burner construction is which the walls of the burner are very well insulated is advantageous in reducing heat losses from the burner and in preventing cold spots within the combustion zone adjacent to the burner walls.

Various hydrocarbon fuels may be utilized in the present process ranging, for example, from methane to heavier fuels such as diesel fuels, e.g. propane, natural gas, lpg, or a hydrocarbon fuel in the gasoline to diesel boiling range. The fuel-to-air ratio under stoichiometric conditions, as required to compute the equivalence ratio, may also be obtained from the ultimate analysis of the fuel by determining the combining weights of oxygen with the various elements in the fuel.

The static pressure (P) within the combustion zone may be varied in the practice of the present invention. For example, the static pressure P may range from about two-thirds of an atmosphere to as high as about 20 atmospheres. As a practical matter, the design parameters of a particular burner may be relatively fixed in a particular use application, such as driving a gas turbine, by the design configuration of the turbine, the available space for the burner, etc. Thus, in operating the burner to provide power while maintaining stable combustion with low levels of nitrogen oxides, carbon monoxide, and unburned hydrocarbons in the exhaust gases, the fuel-to-air ratio within the combustion zone of the burner may be the only parameter which can be varied in controlling combustion.

If the design dimensions for the burner are flexible, the combustion conditions may also be controlled by varying the volume of the burner as described previously. However, if the burner dimensions are fixed, the only means for controlling combustion will be to bypass a portion of the incoming air to adjust the equivalence ratio within the burner combustion zone.

In use applications where the demands on the burner are fixed, i.e., steady state operation, the burner can be designed to operate at a given fuel-to-air ratio without bypass or at a given fuel-to-air ratio with a fixed bypass to a dilution zone positioned downstream from the combustion zone of the burner. However, in use applications, such as providing power for an automobile, where the demands on the burner are variable, it is necessary to vary the combuston conditions within the burner to fit the demands placed on the burner. As described, this is accomplished according to the present invention by varying the fuel-to-air ratio within the combustion zone of the burner to maintain the combustion temperature at about 3,000° F or less while maintaining stable combustion at a sufficient level above lean blowout to provide a low carbon monoxide content in the exhaust gases. By varying the fuel-to-air ratio and the equivalence ratio within the combustion zone of the burner, this result is achieved under varying use conditions such as cold start, rapid acceleration, and rapid deceleration in providing for a gas turbine to operate an automobile.

I claim:

1. A combustion process for producing exhaust gases having a low content of carbon monoxide and nitrogen oxides, said process comprising:

introducing a mixture of hydrocarbon fuel and air into a combustion zone having a volume which is sufficient to support stable combustion under the desired combustion conditions, with the mixture being premixed to a sufficient extent to provide a substantially uniform and homogeneous mixture within the combustion zone;

igniting and burning the mixture within the combustion zone;

maintaining the combustion temperature at about 3000° F. or less to reduce the content of nitrogen oxides in the exhaust gases to a level of about 1.5 grams or less for each kilogram of consumed fuel;

controlling the fuel-to-air ratio in the combustion zone at lean fuel-to-air ratios of about 0.0035 to about 0.035 under stable combustion conditions which exceed lean blowout to a sufficient extent to reduce the carbon monoxide levels in the exhaust gases to about 12.0 grams or less per kilogram of consumed fuel, and maintaining the flow rate of the fuel-air mixture into the combustion zone at a level which exceeds the turbulent flame velocity within the combustion zone to prevent flashback to the point of introduction of the combustible mixture.

2. A combustion process for producing exhaust gases having a low content of carbon monoxide and nitrogen oxides, said process comprising:

introducing a mixture of hydrocarbon fuel and air into a combustion zone having a volume which is sufficient to support stable combustion under the desired combustion conditions, with the mixture being premixed to a sufficient extent to provide a substantially uniform and homogeneous mixture within the combustion zone;

igniting and burning the mixture within the combustion zone;

maintaining the walls which define the combustion zone at temperatures which are sufficiently close to the combustion temperature to prevent quenching of the combustion reaction in the regions adjacent the walls to an extent which forms excessive quantities of carbon moxoxide and unburned hydrocarbons adjacent the burner walls;

providing a dilution zone which is positioned downstream from the combustion zone and in flow communication with the combustion zone;

splitting the incoming stream of air into a first stream which is introduced into the combustion zone and a second stream which is introduced into the dilution zone;

controlling the flow split of the said first stream to provide a ratio of fuel to air within the combustion zone at lean fuel-to-air ratios of about 0.0035 to about 0.035 under stable combustion conditions which exceed lean blowout to a sufficient extent to reduce the carbon monoxide levels in the exhaust gases to about 12.0 grams or less per kilogram of consumed fuel while maintaining the combustion temperature at about 3,000° F. or less to reduce the content of nitrogen oxides in the exhaust gases to a level of about 1.5 grams or less for each kilogram of consumed fuel, and maintaining the flow rate of the fuel-air mixture into the combustion zone at a level which exceeds the turbulent flame velocity within the combustion zone to prevent flashback to the point of introduction of the combustible mixture.

3. The process of claim 2 wherein the fuel is vaporized prior to its introduction into the combustion zone.

4. The process of claim 2 wherein the combustion zone temperature is maintained between about 2,100° to about 3,000° F.

5. The process of claim 2 wherein the hydrocarbon fuel is propane, nautral gas, lpg, or a fuel in the gasoline to diesel boiling range.

6. The process of claim 2 including the step of heating the incoming stream of air prior to its introduction into the combustion zone.

7. The process of claim 2 wherein the fuel-to-air ratio within the combustion zone is varied in controlling the combustion in response to variations in the fuel flow to the combustion zone or variations in the flow rate of incoming air.

8. The process of claim 2, including the steps of admixing water with the fuel and vaporizing the water with the quantity of water and the extend of water vaporization controlled to form a sufficient quantity of water vapor or carry the fuel into the combustion zone in the form of microscopic fuel droplets of a sufficiently small size to provide an essentially homogeneous combustible mixture within the combustion zone.

9. The process of claim 2, including sensing the content of nitrogen oxides or carbon monoxide, or both, in the exhaust gases;

providing a signal or force that is proportional to the said level of nitrogen oxides or carbon monoxide or both, and splitting the incoming stream of air in response to the signal or force to control the flow rate of the first stream at a level which reduces the nitrogen oxide levels in the exhaust gases to about 1.5 grams or less for each kilogram of consumed fuel and the carbon monoxide levels in the exhaust gases to about 12.0 grams or less for each kilogram of consumed fuel, or reduces both the nitrogen oxide content and the carbon monoxide content to said levels.

10. A process for operating a gas turbine to reduce the content of carbon monoxide and nitrogen oxides in the turbine exhaust gases, said process comprising:

introducing a mixture of a hydrocarbon fuel and air into a combustion zone having a volume sufficient to support stable combustion under the desired combustion conditions and burning the mixture with the combustible mixture being well mixed to provide a substantially uniform and homogeneous mixture within the combustion zone;

maintaining the combustion temperature within the combustion zone at a level of about 3,000° F or less to reduce the nitrogen oxides content in the exhaust gases to a level of about 1.5 grams or less for each kilogram of consumed fuel;

maintaining a lean fuel-to-air ratio in the combustion zone of about 0.0035 to about 0.035 under stable combustion conditions and at a sufficient level above lean blowout to reduce the carbon monoxide level in the exhaust gases to about 12.0 grams or less per kilogram of consumed fuel;

maintaining the flow rate of the fuel-air mixture into the combustion zone at a level in excess of the turbulent flame velocity in the combustion zone to prevent flashback to the point of introduction of the combustible mixture, and conveying the exhaust gases from the combustion zone to a turbine rotor to drive the rotor in producing power.

11. A process for operating a gas turbine to reduce the content of carbon monoxide and nitrogen oxides in the turbine exhaust gases, said process comprising:

introducing a mixture of a hydrocarbon fuel and air into a combustion zone having a volume sufficient to support stable combustion under the desired combustion conditions and burning the mixture with the combustible mixture being well mixed to provide a substantially uniform and homogeneous mixture within the combustion zone;

providing a dilution zone which is positioned downstream of the combustion zone in flow communication with the combustion zone;

splitting the incoming stream of air into a first stream which is introduced into the combustion zone and a second stream which is introduced into the dilution zone;

controlling the flow split of the first stream to maintain the combustion temperature within the combustion zone at a level of about 3,000° F. or less to reduce the nitrogen oxides content in the exhaust gases to a level of about 1.5 grams or less for each kilogram of consumed fuel while maintaining a lean fuel-to-air ratio in the combustion zone of about 0.0035 to about 0.035 under stable combustion conditions at a sufficient level above lean flowout to reduce the carbon monoxide level in the exhaust gases to about 12.0 grams or less per kilogram of consumed fuel;

maintaining the flow rate of the fuel-air mixture into the combustion zone at a level in excess of the turbulent flame velocity in the combustion zone to prevent flashback to the point of introduction of the combustible mixture; and conveying the exhaust gases from the combustion zone to a turbine rotor to drive the rotor in producing power.

12. The process of claim 11, including the step of prevaporizing the fuel prior to its introduction into the combustion zone.

13. The process of claim 12, including the step of compressing the incoming stream of air by passing the incoming stream through a compressor driven by the turbine rotor.

14. The process of claim 12, including the step of transferring heat from the exhaust gases to the stream of incoming air to preheat the incoming stream prior to its introduction into the combustion zone.

15. The process of claim 12, including the step of transferring heat from the exhaust gases to the incoming fuel with the heat transfer being carried out at a temperature below the decomposition temperature of the fuel.

16. The process of claim 15, including the step of removing excess heat from the exhaust gases when the heat transfer from the exhaust gases would cause the incoming fuel to reach a temperature above the decomposition temperature of the fuel.

17. The process of claim 16, including the step of transferring the excess heat removed from the exhaust gases to the incoming stream of air.

18. The process of claim 11, including the steps of admixing water with the fuel and vaporizing the water with the quantity of water and the extent of water vaporization controlled to form a sufficient quantity of water vapor to carry the fuel into the combustion zone in the form of microscopic fuel droplets of a sufficiently small size to provide an essentially homogeneous combustible mixture within the combustion zone.

19. The process of claim 11, including the steps of sensing the content of nitrogen oxides or carbon monoxide in the exhaust gases, or both the content of nitrogen oxides and carbon monoxide in the exhaust gases;

providing a signal or force that is proportional to the said content of nitrogen oxides or carbon monoxide, or both, and splitting the incoming stream of air in response to the signal or force to control the flow rate of the first stream at a level which reduces the nitrogen oxide levels in the exhaust gases to about 1.5 grams or less for each kilogram of consumed fuel or the carbon monoxide levels in the exhaust gases to about 12.0 grams or less for each kilogram of consumed fuel, or reduces both the nitrogen oxide and carbon monoxide content to said levels.

20. The process of claim 11 wherein the hydrocarbon fuel is propane, natural gas, lpg, or a fuel in the gasoline to diesel boiling range.

21. The process of claim 11 wherein the combustion zone temperature is maintained between about 2,000° F. to about 3,000° F.

22. The process of claim 2 including:

sensing the actual temperature in the combustion zone;

sensing the fuel flow rate to the combustion zone and the flow rate of the incoming stream of air and determining a set combustion temperature required to maintain a selected nitrogen oxides level in the exhaust gases;

comparing the set combustion temperature with the actual combustion temperature, and varying the splitting of the incoming stream of air in response to the difference between the set combustion temperature and the actual combustion temperature to bring the actual combustion temperature into correspondence with the set combustion temperature.

23. The process of claim 2 including:

sensing actual temperature in the combustion zone;

sensing the inlet air temperature, the pressure in the combustion zone, the fuel flow rate and the flow rate of the incoming stream of air and determining a set combustion temperature required to maintain a selected level of carbon monoxide in the exhaust gases at the sensed conditions;

comparing the set combustion temperature with the actual combustion temperature, and splitting the incoming stream of air in response to the set combustion temperature and the actual combustion temperature to bring the actual combustion temperature into correspondence with the set combustion temperature.

24. The process of claim 2 including:

sensing the flow rate of the incoming stream of air, the fuel flow rate, the temperature of the incoming stream of air and the flow split of the incoming stream of air into said first and second streams and determining the actual combustion temperature within the combustion zone;

determining a set combustion temperature from the fuel flow rate and the flow rate of the incoming stream of air that is required to maintain a selected nitrogen oxides level in the exhaust gases;

comparing the set combustion temperature with the actual combustion temperature, and varying the splitting of the incoming stream of air in response to the difference between the combustion temperature and the actual combustion temperature to bring the actual combustion temperature into correspondence with the set combustion temperature.

25. The process of claim 2 including:

sensing the flow rate of the incoming stream of air, the fuel flow rate, the temperature of the incoming stream of air and the flow split of the incoming stream of air into said first and second streams and determining the actual combustion temperature within the combustion zone;

sensing the inlet air temperature, the pressure in the combustion zone, the fuel flow rate and the flow rate of the incoming stream of air and determining a set combustion temperature required to maintain a selected level of carbon monoxide in the exhaust gases at the sense combustions, comparing the set combustion temperature with the actual combustion temperature, and splitting the incoming stream of air in response to the difference between the set combustion temperature and the actual combustion temperature to bring the actual combustion temperature into correspondence with the set combustion temperature.

26. The process of claim 2 including:

sensing the fuel flow rate to the combustion zone and the flow rate of the incoming stream of air and determining a set combustion temperature required to maintain a selected nitrogen oxides level in the exhaust gases;

sensing the temperature of the incoming air stream and determining the difference between the temperature of the incoming air stream and the set combustion temperature;

determining the required fuel-to-air ratio in the combustion zone to raise the temperature of the air entering the combustion zone to the set combustion temperature;

sensing the fuel flow rate and the flow rate of the incoming stream of air and determining the fuel-to-air ratio;

comparing the required fuel-to-air ratio in the combustion zone with the fuel-to-air ratio to determine the required flow split of the incoming air stream to provide the set combustion temperature;

sensing the actual flow split of the incoming stream of air, and changing the actual flow split to bring it into correspondence with the required flow split of the incoming air stream.

27. The process of claim 2 including:

sensing the inlet air temperature, the pressure in the combustion zone, the fuel flow rate and the flow rate of the incoming stream of air and determining a set combustion temperature required to maintain a selected level of carbon monoxide in the exhaust gases at the sensed conditions;

sensing the temperature of the incoming air stream and determining the difference between the temperature of the incoming air stream and the set combustion temperature;

determining the required fuel-to-air ratio in the combustion zone to raise the temperature of the air entering the combustion zone to the set combustion temperature;

sensing the fuel flow rate and the flow rate of the incoming stream of air and determining the fuel-to-air ratio;

comparing the required fuel-to-air ratio in the combustion zone with the fuel-to-air ratio to determine the required flow split of the incoming air stream to provide the set combustion temperature;

sensing the actual flow split of the incoming stream of air, and changing the actual flow split to bring it into correspondence with the required flow split of the incoming air stream.

* * * * *